(12) United States Patent
Fujiwara

(10) Patent No.: US 9,409,540 B2
(45) Date of Patent: Aug. 9, 2016

(54) VEHICLE OCCUPANT PROTECTION SYSTEM

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/953,242

(22) Filed: Nov. 27, 2015

(65) Prior Publication Data

US 2016/0159307 A1 Jun. 9, 2016

(30) Foreign Application Priority Data

Dec. 3, 2014 (JP) .................. 2014-245153

(51) Int. Cl.
| | |
|---|---|
| *B60R 21/207* | (2006.01) |
| *B60R 21/2165* | (2011.01) |
| *B60R 21/263* | (2011.01) |
| *B60R 21/013* | (2006.01) |
| *B60R 21/00* | (2006.01) |
| *B60R 21/01* | (2006.01) |

(52) U.S. Cl.
CPC ............. *B60R 21/207* (2013.01); *B60R 21/013* (2013.01); *B60R 21/2165* (2013.01); *B60R 21/263* (2013.01); *B60R 2021/0006* (2013.01); *B60R 2021/01211* (2013.01); *B60R 2021/01286* (2013.01)

(58) Field of Classification Search
CPC .. B60R 21/207; B60R 21/013; B60R 21/263; B60R 21/2165; B60R 2021/01211; B60R 2021/01286; B60R 2021/0006
See application file for complete search history.

(56) References Cited

U.S. PATENT DOCUMENTS

| | | | |
|---|---|---|---|
| 5,499,840 A | 3/1996 | Nakano | |
| 5,860,673 A * | 1/1999 | Hasegawa | B60R 21/207 280/728.3 |
| 5,988,674 A * | 11/1999 | Kimura | B60R 21/207 280/728.3 |
| 5,997,032 A | 12/1999 | Miwa et al. | |
| 7,401,806 B2 * | 7/2008 | Tracht | B60R 21/207 280/728.3 |
| 7,637,529 B2 * | 12/2009 | Tracht | B60R 21/207 280/728.2 |
| 8,152,197 B2 * | 4/2012 | Taguchi | B60R 21/207 280/728.2 |
| 8,282,126 B2 | 10/2012 | Wiik et al. | |
| 2005/0156412 A1* | 7/2005 | Panagos | B60R 21/201 280/730.2 |
| 2006/0113756 A1* | 6/2006 | Tracht | B60N 2/5883 280/730.1 |

(Continued)

FOREIGN PATENT DOCUMENTS

| | | |
|---|---|---|
| JP | H07-267037 A | 10/1995 |
| JP | H10-250522 A | 9/1998 |

(Continued)

*Primary Examiner* — Drew Brown
(74) *Attorney, Agent, or Firm* — Oliff PLC

(57) ABSTRACT

A vehicle occupant protection system includes: an outside airbag; reinforcement cloths that are attached to a reverse surface of a seat cover, in a region at a the vehicle width direction outer side, and a region at a seat front side, of the outside airbag, the reinforcement cloths being attached from an outside splitting portion; an inside airbag; webbings that are secured to a side frame (a frame) of a seat back, with each having an end portion fastened to an inside splitting portion; an outside inflator that supplies a gas for inflation to the seat outside airbag; an inside inflator that supplies a gas for inflation to the seat inside airbag; and a control unit which, at a time of a side crash, actuates the inside inflator later than the outside inflator.

11 Claims, 13 Drawing Sheets

(56) References Cited

U.S. PATENT DOCUMENTS

| | | | |
|---|---|---|---|
| 2006/0113768 A1* | 6/2006 | Tracht | B60R 21/207 280/730.2 |
| 2006/0113771 A1* | 6/2006 | Tracht | B60R 21/207 280/730.2 |
| 2012/0038131 A1* | 2/2012 | Muller | B60R 21/201 280/728.2 |
| 2012/0091697 A1 | 4/2012 | Wiik et al. | |
| 2014/0042733 A1* | 2/2014 | Fukawatase | B60R 21/23138 280/730.2 |
| 2015/0115578 A1* | 4/2015 | Sahashi | B60N 2/427 280/728.3 |
| 2015/0251623 A1* | 9/2015 | Fujiwara | B60R 21/207 280/728.2 |
| 2015/0367805 A1* | 12/2015 | Santi | B60R 21/2165 280/728.3 |
| 2016/0101760 A1* | 4/2016 | Fujiwara | B60R 21/261 280/728.3 |

FOREIGN PATENT DOCUMENTS

| | | |
|---|---|---|
| JP | 2012-081958 A | 4/2012 |
| JP | 2014-034356 A | 2/2014 |
| JP | 2014-076736 A | 5/2014 |

* cited by examiner

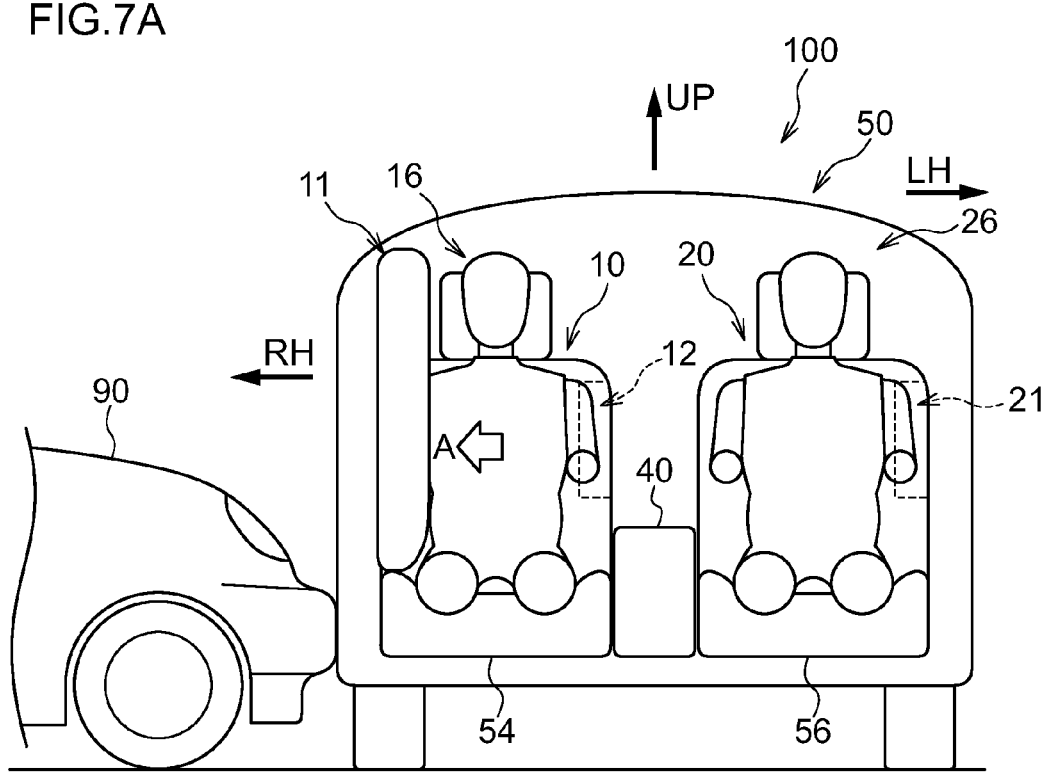
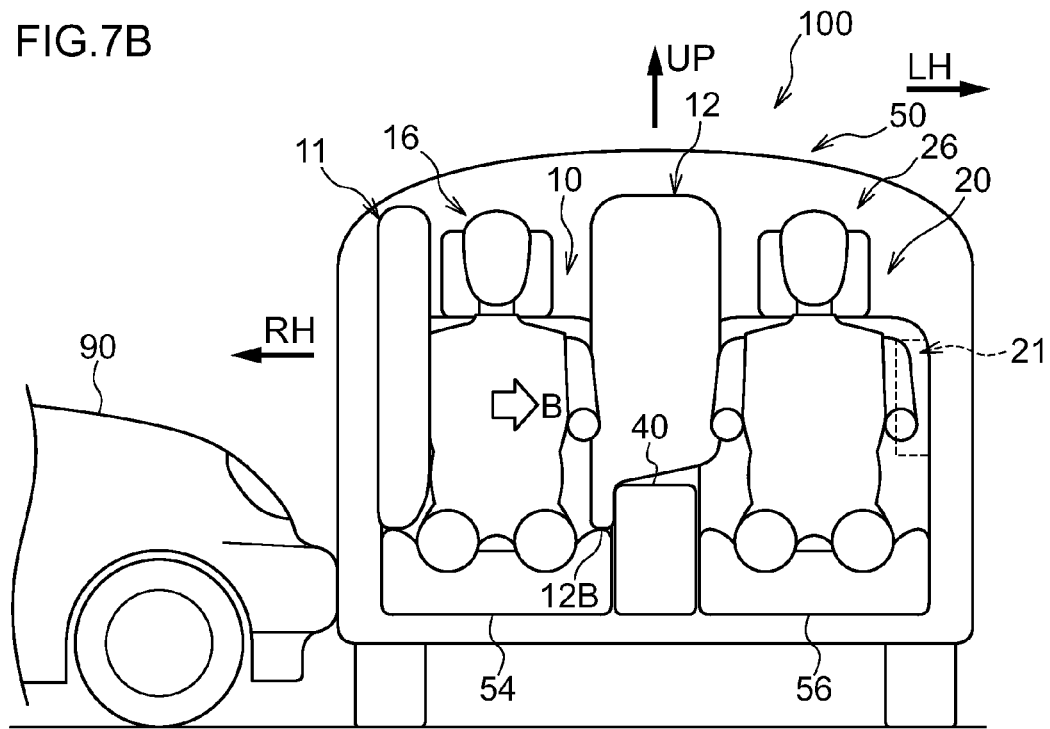

VEHICLE OCCUPANT PROTECTION SYSTEM

CROSS-REFERENCE TO RELATED APPLICATION

This application claims priority under 35 USC 119 from Japanese Patent Application No. 2014-245153 filed on Dec. 3, 2014, the disclosure of which is incorporated by reference herein.

BACKGROUND

1. Technical Field

An embodiment of the present invention relates to a vehicle occupant protection system.

2. Description of the Related Art

Japanese Patent Application Laid-open (JP-A) No. H10-250522 discloses a seat structure with a side airbag where a reinforcement cloth that does not easily stretch and is high in strength like the fabric of the airbag is sewn to the reverse surface of a seat back cover. An end edge portion of the reinforcement cloth is sewn to a sewn portion (a splitting portion) of the seat back cover that becomes an inflation position of the airbag. When the airbag deploys, a concentration of stress is produced in the sewn portion by the reinforcement cloth so that the sewn portion quickly ruptures, and thus the seat back cover splits open and the airbag inflates outside the seat back.

Furthermore, JP-A No. 2014-76736 discloses a side airbag device where a webbing is placed around an airbag module. The webbing is attached to a seat back frame together with the airbag module and surrounds the airbag module. Front ends of the webbing are sewn to a splitting portion of a seat cover.

According to the splitting portion using the reinforcement cloth (see JP-A No. H10-250522), early deployability of the airbag at the time of a side crash, for example, can be ensured and at the same time the attachability of the airbag to the side portion of the seat back can be improved compared to the structure where the webbing is placed around the airbag (see JP-A No. 2014-76736). Consequently, in a case where an outside airbag is installed on the vehicle width direction outer side of the seat back and an inside airbag is installed on the vehicle width direction inner side, the splitting portion using the reinforcement cloth can conceivably be disposed in correspondence not only to the outside airbag but also to the inside airbag.

However, the splitting portion using the reinforcement cloth utilizes the tension in the seat back cover to allow the splitting portion to rupture. If, for example, the vehicle width direction inner side splitting portion of the splitting portions on both vehicle width direction sides ruptures first, the tension in the seat back cover drops and it becomes difficult for stress to concentrate in the vehicle width direction outer side splitting portion. If this happens, it is conceivable that it will become difficult for the vehicle width direction outer side splitting portion to rupture.

SUMMARY OF THE INVENTION

It is an object of an embodiment of the present invention to suppress, in a structure where an outside airbag and an inside airbag are disposed at at least one of the seat backs of a driver seat or a front passenger seat and where a splitting portion using reinforcement cloths is disposed in correspondence to the outside airbag, the deployment of the outside airbag from happening later than the deployment of the inside airbag.

A vehicle occupant protection system pertaining to a first aspect of the present invention includes: an outside airbag that is housed in a side portion at a vehicle width direction outer side of a seat back of at least one of a driver seat or a front passenger seat; reinforcement cloths that are attached to a reverse surface of a seat cover, in a region at a vehicle width direction outer side, and a region at a seat front side, of the outside airbag, the reinforcement cloths being attached from an outside splitting portion that splits open in conjunction with inflation and deployment of the outside airbag, and the reinforcement cloths not stretching as easily as the seat cover; an inside airbag that is housed in a side portion at a vehicle width direction inner side of the seat back; webbings that are secured to a frame of the seat back and that are disposed at least at a vehicle width direction outer side and a vehicle width direction inner side of the inside airbag, each having an end portion fastened to an inside splitting portion that splits open in conjunction with inflation and deployment of the inside airbag, the webbings not stretching as easily as the seat cover; an outside inflator that is disposed in correspondence to the outside airbag and supplies a gas for inflation to the outside airbag; an inside inflator that is disposed in correspondence to the inside airbag and supplies a gas for inflation to the inside airbag; and a control unit which, at a time of a side crash, actuates the inside inflator later than the outside inflator when inflating and deploying the outside airbag and the inside airbag of a seat on the crash side.

In this vehicle occupant protection system, the outside airbag is supplied with the gas for inflation from the outside inflator and starts to inflate, and when the outside splitting portion of the seat cover is split open by the inflation pressure of the outside airbag, the outside airbag inflates and deploys outside the seat back. At this time, a concentration of stress is produced in the outside splitting portion by the reinforcement cloths attached to the reverse surface of the seat cover, so the outside splitting portion can be quickly split open.

Furthermore, in this vehicle occupant protection system, the inside airbag is supplied with the gas for inflation from the inside inflator and starts to inflate, and when the inside splitting portion of the seat cover is split open by the inflation pressure of the inside airbag, the inside airbag inflates and deploys outside the seat back. At this time, a concentration of stress is produced in the inside splitting portion by the webbings, so the inside splitting portion can be quickly split open.

The reinforcement cloths disposed in correspondence to the outside airbag produce a concentration of stress in the outside splitting portion utilizing the tension in the seat cover. In contrast, the webbings disposed in correspondence to the inside airbag are secured to the frame of the seat back and each has the end portion fastened to the inside splitting portion, so they can produce a concentration of stress in the inside splitting portion regardless of the magnitude of the tension in the seat cover.

Therefore, at the time of a side crash, when inflating and deploying the outside airbag and the inside airbag of the seat on the crash side, the control unit first actuates the outside inflator of the seat on the crash side. Because of this, the gas for inflation is supplied to the outside airbag and the outside airbag inflates and deploys. Furthermore, the control unit actuates the inside inflator of the seat on the crash side later than this. Because of this, the gas is supplied to the inside airbag and the inside airbag inflates and deploys. At this time, the reinforcement cloths disposed in correspondence to the outside airbag quickly split open the outside splitting portion utilizing the tension in the seat cover. When the outside splitting portion corresponding to the outside airbag splits open, the tension in the seat cover drops, but the webbings disposed in correspondence to the inside airbag are unaffected by the drop in the tension in the seat cover and can quickly split open the inside splitting portion.

A second aspect is the vehicle occupant protection system pertaining to the first aspect, wherein the outside airbag is disposed at the driver seat and the front passenger seat; when the inside airbag inflates and deploys, a bottom portion of the inside airbag inflates and deploys at a position on a vehicle lower side of an upper surface of a console disposed between the driver seat and the front passenger seat; and at the time of a side crash, when inflating and deploying the outside airbag of the seat on the crash side and the inside airbag of the seat on the opposite side from the crash side, the control unit simultaneously actuates the outside inflator of the seat on the crash side and the inside inflator of the seat on the opposite side from the crash side.

In this vehicle occupant protection system, in a case where the inside airbag is disposed at the seat on the opposite side from the crash side at the time of a side crash, that inside airbag and the outside airbag of the seat on the crash side are inflated and deployed. At this time, the control unit simultaneously actuates the outside inflator of the seat on the crash side and the inside inflator of the seat on the opposite side from the crash side. Because of this, the gas is supplied at the same timing to the outside airbag of the seat on the crash side and the inside airbag of the seat on the opposite side from the crash side.

The occupant seated on the seat on the opposite side from the crash side relatively moves closer to the console due to inertia, but when the inside airbag inflates and deploys, the bottom portion of the inside airbag inflates and deploys at the position on the vehicle lower side of the upper surface of the console. Because of this, the inside airbag can be inflated and deployed in the space between the occupant seated on the seat on the opposite side from the crash side and the console, and a reaction force at the time of occupant restraint can be produced in the console.

A third aspect is the vehicle occupant protection system pertaining to the second aspect, wherein the inside airbag is disposed at the driver seat or the front passenger seat.

In this vehicle occupant protection system, the inside airbag is disposed at the driver seat or the front passenger seat, and the actuation of the inflators is controlled in accordance with the installation position of the inside airbag and the crash direction. In a case where the inside airbag is disposed at the seat on the crash side, the control unit first actuates the outside inflator of the seat on the crash side. Because of this, the gas for inflation is supplied to the outside airbag of the seat on the crash side. Furthermore, the control unit actuates the inside inflator of the seat on the crash side later than this. Because of this, the gas for inflation is supplied to the inside airbag. On the other hand, in a case where the inside airbag is disposed at the seat on the opposite side from the crash side, the control unit simultaneously actuates the outside inflator of the seat on the crash side and the inside inflator of the seat on the opposite side from the crash side. Because of this, the gas is simultaneously supplied to the outside airbag of the seat on the crash side and the inside airbag of the seat on the opposite side from the crash side. In any case, during the initial stage of the crash the occupant seated on the seat on the crash side can be protected by the outside airbag and the occupant seated on the seat on the opposite side from the crash side can be protected by the inside airbag.

A fourth aspect is the vehicle occupant protection system pertaining to the second aspect, wherein the inside airbag is disposed at both the driver seat and the front passenger seat.

In this vehicle occupant protection system, no matter whether a side crash occurs on the driver seat side or the front passenger seat side, the control unit first simultaneously actuates the outside inflator of the seat on the crash side and the inside inflator of the seat on the opposite side from the crash side. Because of this, the gas is simultaneously supplied to the outside airbag of the seat on the crash side and the inside airbag of the seat on the opposite side from the crash side. Furthermore, the control unit actuates the inside inflator of the seat on the crash side later than this. Because of this, the gas is supplied to the inside airbag of the seat on the crash side. Because of this, during the initial stage of the crash the occupant seated on the seat on the crash side can be protected by the outside airbag of that seat and the occupant seated on the seat on the opposite side from the crash side can be protected by the inside airbag of that seat. Furthermore, thereafter, the occupant seated on the seat on the crash side can be suppressed by the inside airbag of that seat from moving toward the opposite side from the crash side due to the reaction force of the outside airbag.

According to the vehicle occupant protection system pertaining to the first aspect of the present invention, there is obtained the superior effect that, in a structure where the outside airbag and the inside airbag are disposed at at least one of the seat backs of the driver seat or the front passenger seat and where the outside splitting portion using reinforcement cloths is disposed in correspondence to the outside airbag, the deployment of the outside airbag can be suppressed from happening later than the deployment of the inside airbag.

According to the vehicle occupant protection system pertaining to the second aspect, there is obtained the superior effect that the protection performance resulting from the inside airbag with respect to the occupant seated on the seat on the opposite side from the crash side can be enhanced.

According to the vehicle occupant protection system pertaining to the third aspect, there is obtained the superior effect that occupant protection performance can be ensured and at the same time the number of inside airbags can be reduced to thereby reduce costs.

According to the vehicle occupant protection system pertaining to the fourth aspect, there is obtained the superior effect that not only occupant protection performance during the initial stage of a crash but also occupant protection performance at an advanced stage of the crash can be ensured.

BRIEF DESCRIPTION OF THE DRAWINGS

FIG. 7A is a front view showing, in relation to the vehicle occupant protection system in a case where the driver seat inside airbag is disposed, a state in which a driver seat outside airbag has inflated and deployed at the time of a side crash on the driver seat side;

FIG. 7B is a front view showing a state in which the driver seat inside airbag has inflated and deployed later than the driver seat outside airbag;

DETAILED DESCRIPTION OF PREFERRED EMBODIMENTS

Figure 1:
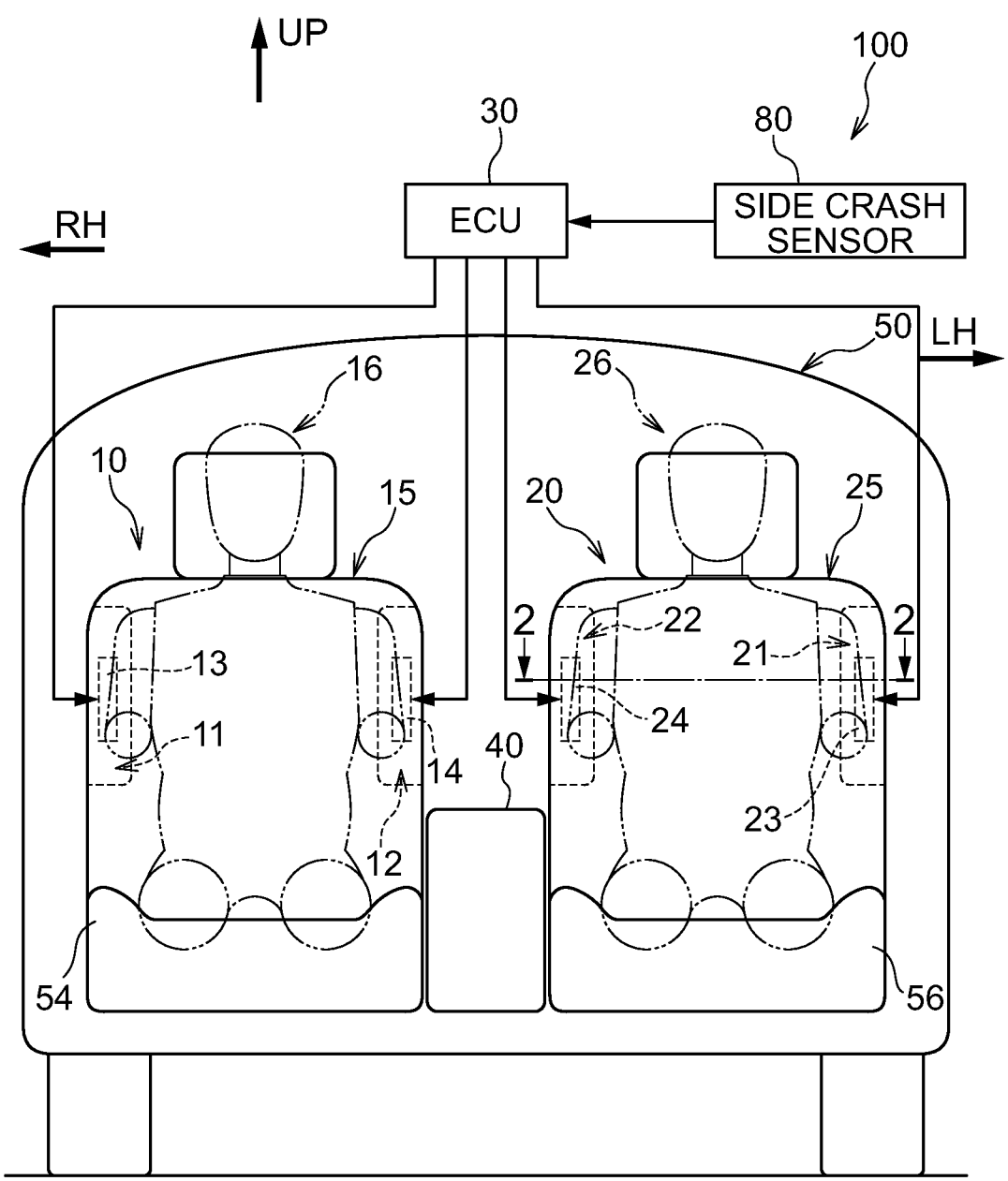
FIG. 1 is a front view schematically showing the general, overall configuration of a vehicle occupant protection system pertaining to an embodiment of the present invention in a case where an inside airbag is disposed at both a driver seat and a front passenger seat.

An embodiment of the present invention will be described below on the basis of the drawings. FIG. 1 shows a driver seat 10 disposed on the right side, for example, of a vehicle 50, a front passenger seat 20 disposed on the left side, and a vehicle occupant protection system 100. The driver seat 10 is a seat on which a driver seat occupant 16 sits, and has a seat back 15 and a seat cushion 54. The front passenger seat 20 is a seat on which a front passenger seat occupant 26 sits, and has a seat back 25 and a seat cushion 56.

[Seat Back]

Figure 2:
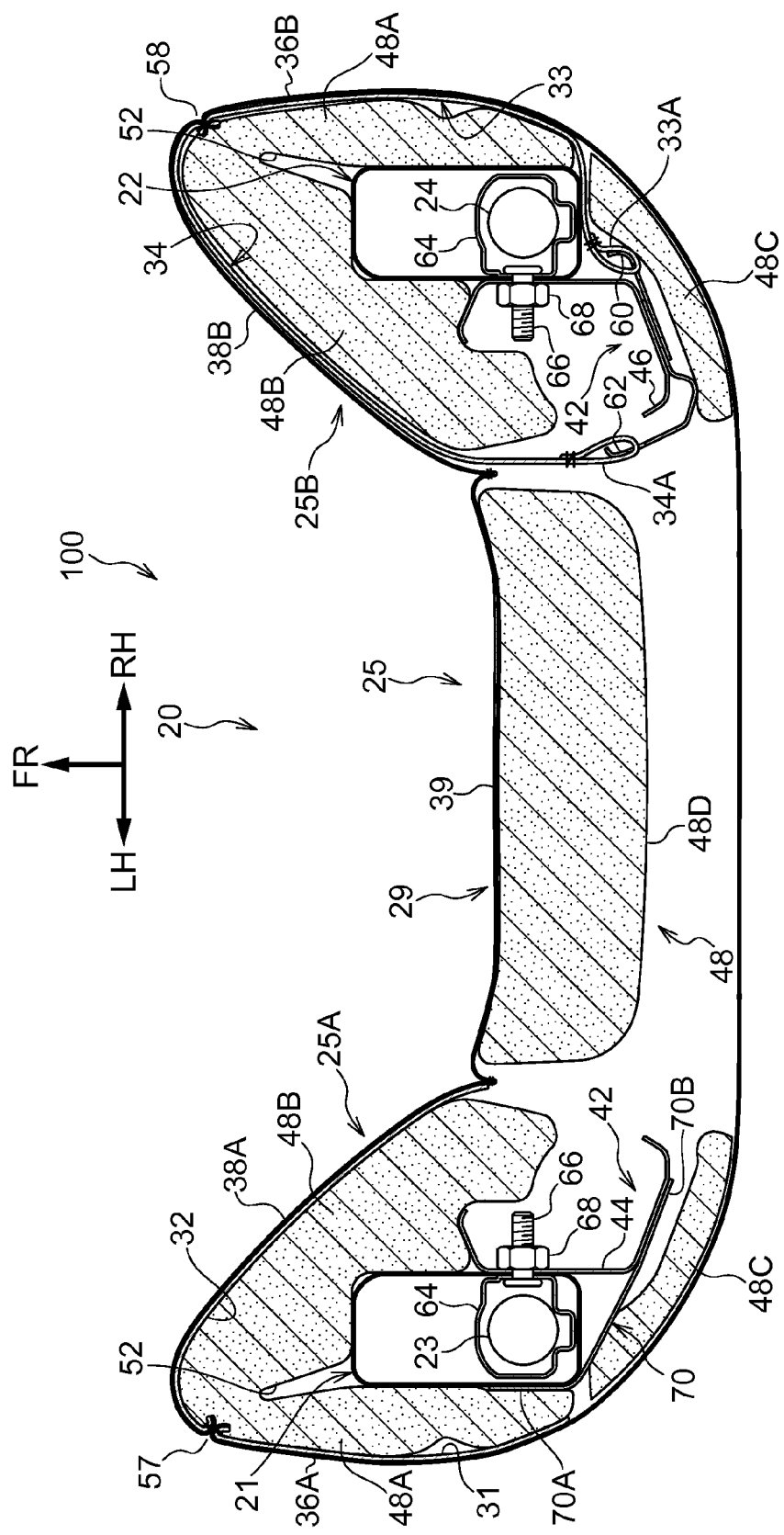
FIG. 2 is an enlarged sectional view, as seen from the direction of the arrows associated with line 2-2 of FIG. 1, showing the front passenger seat equipped with the vehicle occupant protection system pertaining to the embodiment.

FIG. 2 shows a cross section of the seat back 25 of the front passenger seat 20. Arrow LH corresponds to a vehicle width direction outer side of the front passenger seat 20, and arrow RH corresponds to a vehicle width direction inner side of the front passenger seat 20. The seat back 25 has a seat back pad 48 attached to a seat back frame 42 and covered by a seat cover 29. The seat back frame 42 configures a skeleton of the seat back 25. A side frame 44 that extends in the height direction of the seat back 25 is disposed at an outside side portion 25A positioned at the vehicle width direction outer side (the seat left side) of the seat back 25. Furthermore, a side frame 46 that extends in the height direction of the seat back 25 is also disposed at an inside side portion 25B on the vehicle width direction inner side (the seat right side) of the seat back 25.

The seat back pad 48 configures a cushion of the seat back 25 and has pad outside portions 48A, pad inside portions 48B, pad rear side portions 48C, and a pad central portion 48D. The pad outside portions 48A configure the seat width direction outer side sections of the outside side portion 25A and the inside side portion 25B. The pad inside portions 48B configure the seat width direction inner side sections of the outside side portion 25A and the inside side portion 25B. The pad rear side portions 48C configure the seat rear side sections of the outside side portion 25A and the inside side portion 25B. Additionally, the pad central portion 48D is placed on the seat back 25 central side of the pad inside portions 48B.

It should be noted that, in FIG. 2, the pad outside portions 48A and the pad inside portions 48B are integrally formed. A recessed portion 52 that opens to a front passenger seat outside airbag 21 described later is disposed at the vicinity of the boundary between the pad outside portion 48A and the pad inside portion 48B on the seat width direction outer side of the seat back 25. The depth direction of the recessed portion 52 coincides with a direction heading from the front passenger seat outside airbag 21 toward an outside splitting portion 57 described later. The recessed portion 52 is disposed in order to allow the pad outside portion 48A and the pad inside portion 48B to quickly rupture when the front passenger seat outside airbag 21 inflates and deploys and to guide the deployment direction of the front passenger seat outside airbag 21 in the direction of the outside splitting portion 57.

The seat cover 29 configures a cover of the seat back 25 and has outside side covers 36A and 36B, outside front side covers 38A and 38B, and a front cover 39. The outside side covers 36A and 36B cover the pad outside portions 48A from the seat width direction outer sides and extend toward the rear side of the pad rear side portions 48C and the pad central portion 48D. The outside front side covers 38A cover the pad inside portions 48B from the seat front side. The front cover 39 covers the pad central portion 48D from the seat front side.

Figure 3:
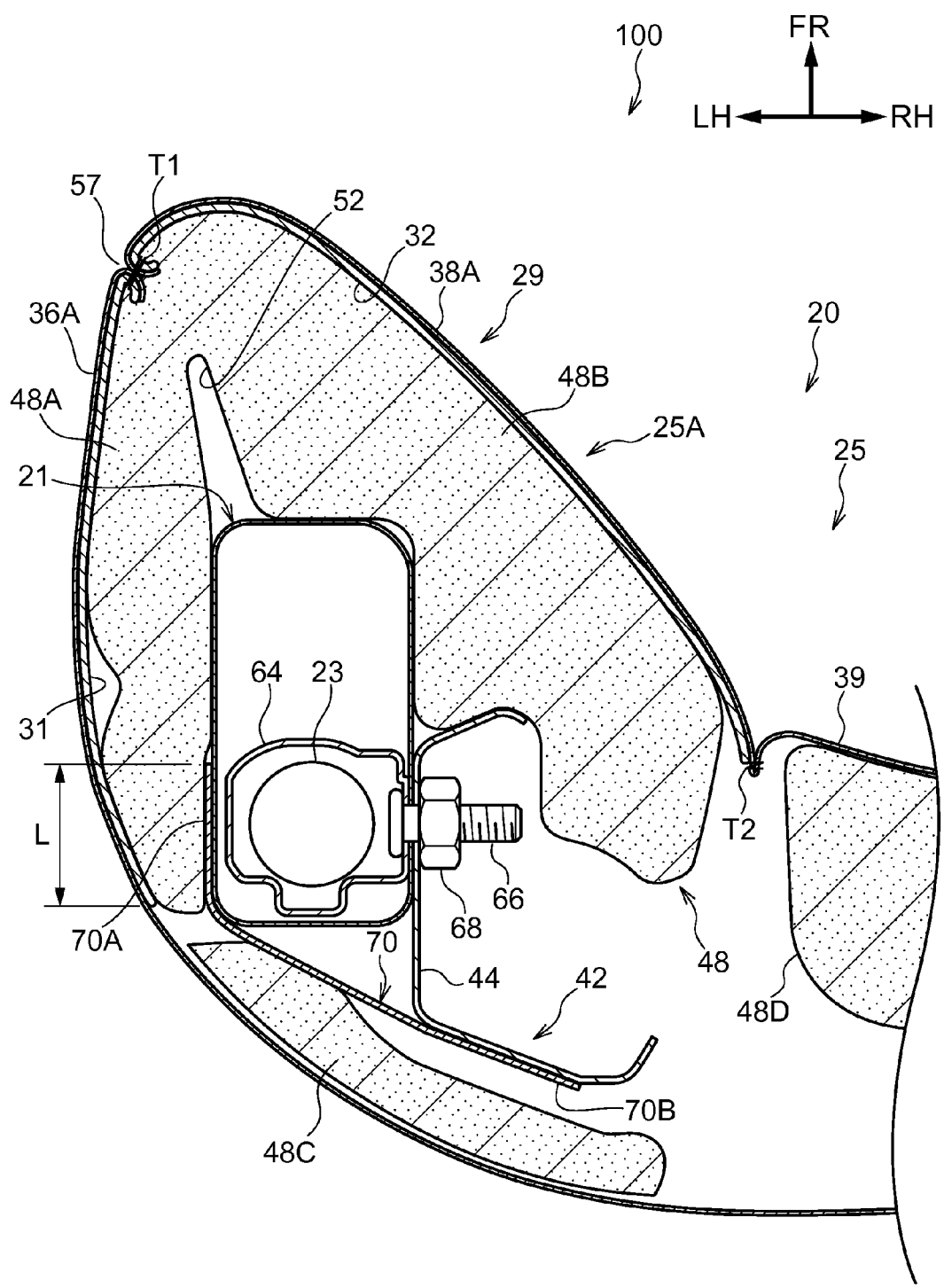
FIG. 3 is an enlarged sectional view showing the structure of a front passenger seat outside airbag and reinforcement cloths disposed in a vehicle width direction outer side side portion of a seat back.

As shown in FIG. 3, in the outside side portion 25A, the seat width direction inner side end portion of the outside front side cover 38A and the seat width direction outer side end portion of the front cover 39 are sewn to each other at a sewn portion T2. Furthermore, the seat width direction outer side end portion of the outside front side cover 38A and the seat front side end portion of the outside side cover 36A are sewn to each other at a sewn portion T1 positioned in the vicinity of the front end portion of the outside side portion 25A. The sewn portion T1 extends in the height direction of the seat back 25 along the front end portion of the outside side portion 25A.

Figure 4:
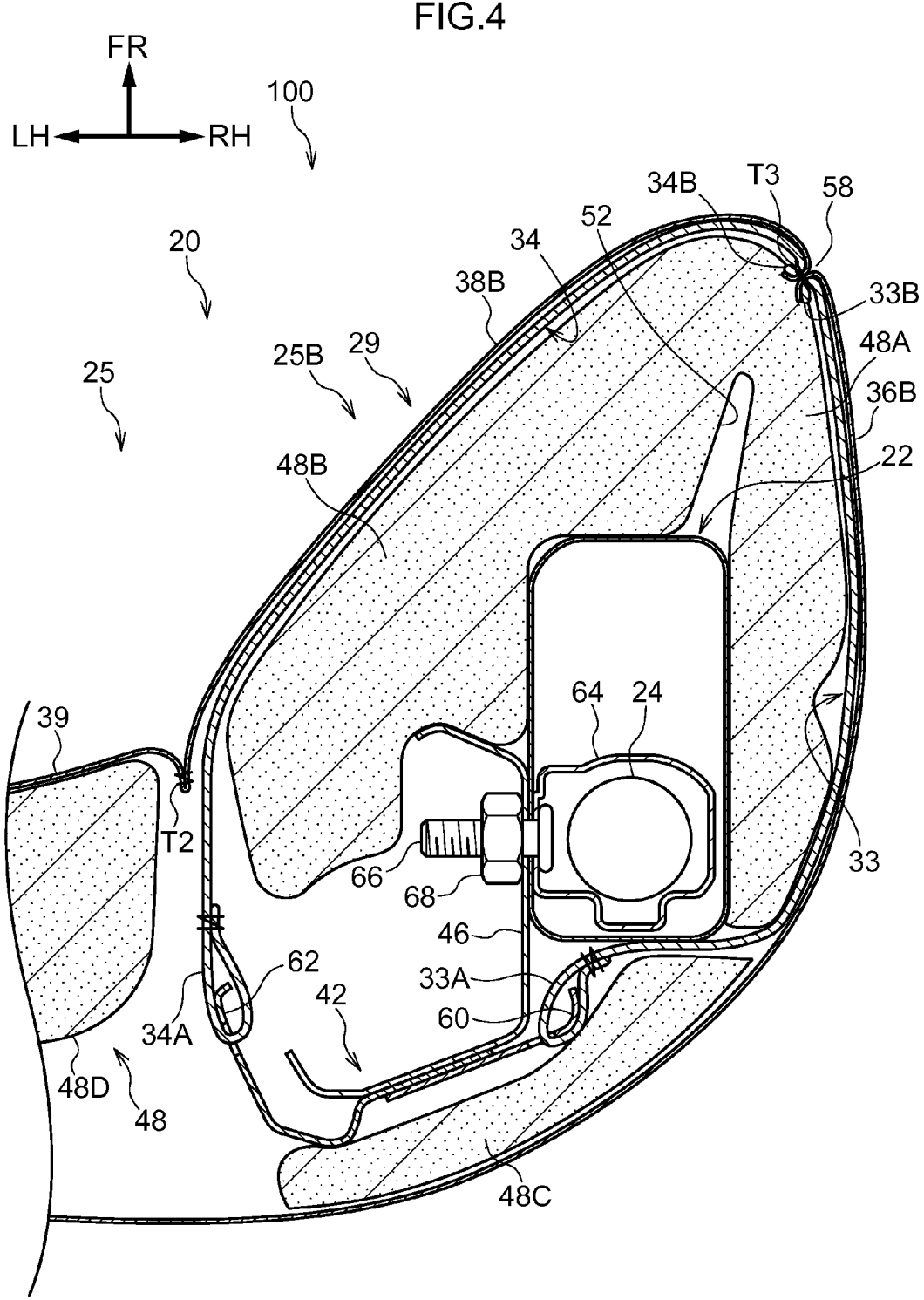
FIG. 4 is an enlarged sectional view showing an example of the structure of a front passenger seat inside airbag and webbings disposed in a vehicle width direction inner side side portion of the seat back.
Figure 5:
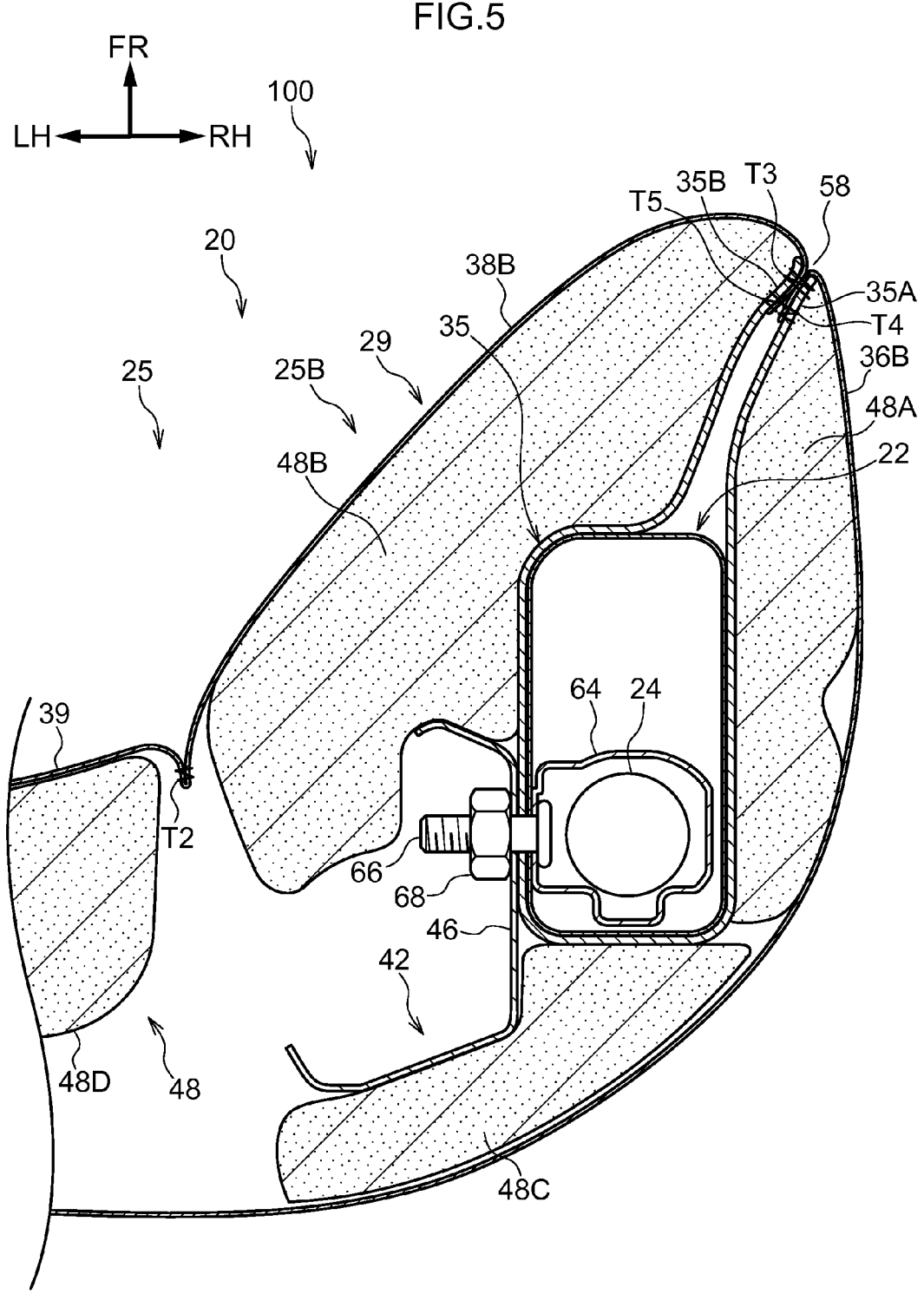
FIG. 5 is an enlarged sectional view showing another example of the structure of the front passenger seat inside airbag and a webbing disposed in the vehicle width direction inner side side portion of the seat back.

In FIG. 4 and FIG. 5, the configuration of the seat cover 29 and the seat back pad 48 in the inside side portion 25B on the vehicle width direction inner side of the seat back 25 is generally bilaterally symmetrical to the same configuration in the outside side portion 25A on the vehicle width direction outer side. A sewn portion T3 corresponds to the sewn portion T1 of FIG. 3. The same reference numerals are assigned in the drawings to other corresponding sections, and description of those corresponding sections will be omitted.

[Vehicle Occupant Protection System]

The structure of the vehicle occupant protection system 100 will be described taking the front passenger seat 20 as an example. In FIG. 2, the vehicle occupant protection system 100 pertaining to the present embodiment is a side airbag system and has the front passenger seat outside airbag 21 that is an example of an outside airbag, reinforcement cloths 31 and 32, a front passenger seat inside airbag 22, webbings 33 and 34, an outside inflator 23, an inside inflator 24, and an airbag ECU 30 (FIG. 1) that is an example of a control unit. The reinforcement cloth 31 is a vehicle width direction outer side reinforcement cloth. The reinforcement cloth 32 is a seat front side reinforcement cloth.

The front passenger seat outside airbag 21 is a bag housed in the outside side portion 25A positioned at the vehicle width direction outer side of the seat back 25 of the front passenger seat 20. The front passenger seat outside airbag 21 is normally folded up inside the outside side portion 25A of the seat back 25, and when it is supplied with a gas for inflation from the outside inflator 23, it inflates and deploys between the front passenger seat occupant 26 (FIG. 1) and a vehicle side portion adjacent to the front passenger seat occupant 26. The front passenger seat outside airbag 21 is, for example, an airbag that protects the region from a shoulder to a waist of the front passenger seat occupant 26.

The reinforcement cloths 31 and 32 are configured by a cloth—such as, for example, the same cloth as the airbag base cloth—that does not stretch as easily as the seat cover 29. The reinforcement cloths 31 and 32 are attached to the reverse surface of the seat cover 29, in a region at the vehicle width direction outer side, and a region at the seat front side, of the front passenger seat outside airbag 21. The reinforcement cloths 31 and 32 are attached from the outside splitting portion 57 that splits open in conjunction with the inflation and deployment of the front passenger seat outside airbag 21.

The region on the vehicle width direction outer side of the front passenger seat outside airbag 21 from the outside splitting portion 57 is, for example, the outside side cover 36A. The reinforcement cloth 31 is attached by sewing, for example, to the reverse surface of the outside side cover 36A. Furthermore, the region on the seat front side from the outside splitting portion 57 is, for example, the outside front side cover 38A. The reinforcement cloth 32 is attached by sewing, for example, to the reverse surface of the outside front side cover 38A. The seat width direction inner side end portion of the reinforcement cloth 32 reaches as far as the vicinity of the sewn portion T2 at which the outside front side cover 38A and the front cover 39 are sewn to each other.

In the outside splitting portion 57, the end portions of the outside side cover 36A and the reinforcement cloth 31 and the end portions of the outside front side cover 38A and the reinforcement cloth 32 are sewn to each other (the sewn portion T1). The outside splitting portion 57 is a burst line that ruptures due to the inflation pressure of the front passenger seat outside airbag 21 when the front passenger seat outside airbag 21 inflates and deploys.

With the structure using the reinforcement cloths 31 and 32, the attachability of the airbag (the front passenger seat outside airbag 21) can be improved compared to a structure using the webbings 33, 34, and 35 described later. It should be noted that the size and placement of the reinforcement cloths 31 and 32 are appropriately changed so that a concentration of stress can be efficiently produced in the outside splitting portion 57 when the front passenger seat outside airbag 21 inflates and deploys. Consequently, for example, the reinforcement cloth 31 may also extend as far as the seat rear side of the position shown in FIG. 2. Furthermore, the number of the reinforcement cloths 31 and 32 in the height direction of the seat back 25 is not limited to one set and may also be plural sets.

In FIG. 4, the front passenger seat inside airbag 22 is a bag housed in the inside side portion 25B positioned at the vehicle width direction inner side of the seat back 25. The front passenger seat inside airbag 22 is normally folded up inside the inside side portion 25B of the seat back 25, and when it is supplied with a gas for inflation from the inside inflator 24, it inflates and deploys on the vehicle width direction inner side of the front passenger seat occupant 26 (FIG. 1).

Figure 9A:
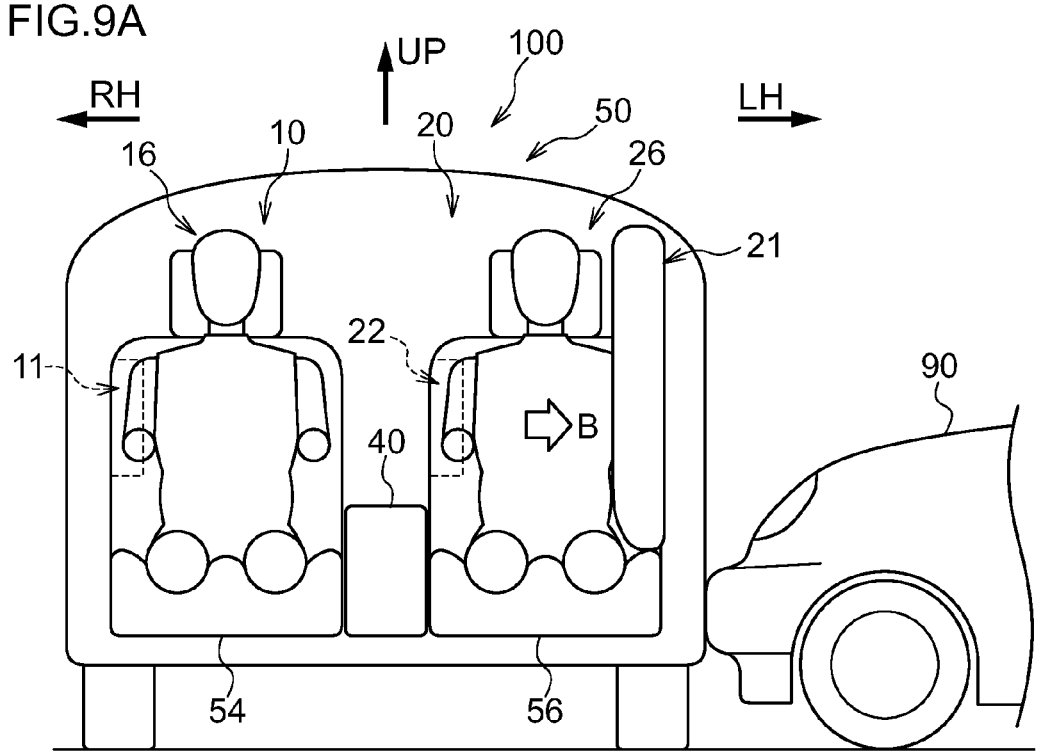
FIG. 9A is a front view showing, in relation to the vehicle occupant protection system in a case where the front passenger seat inside airbag is disposed, a state in which the front passenger seat outside airbag has inflated and deployed at the time of a side crash on the front passenger seat side.
Figure 9B:
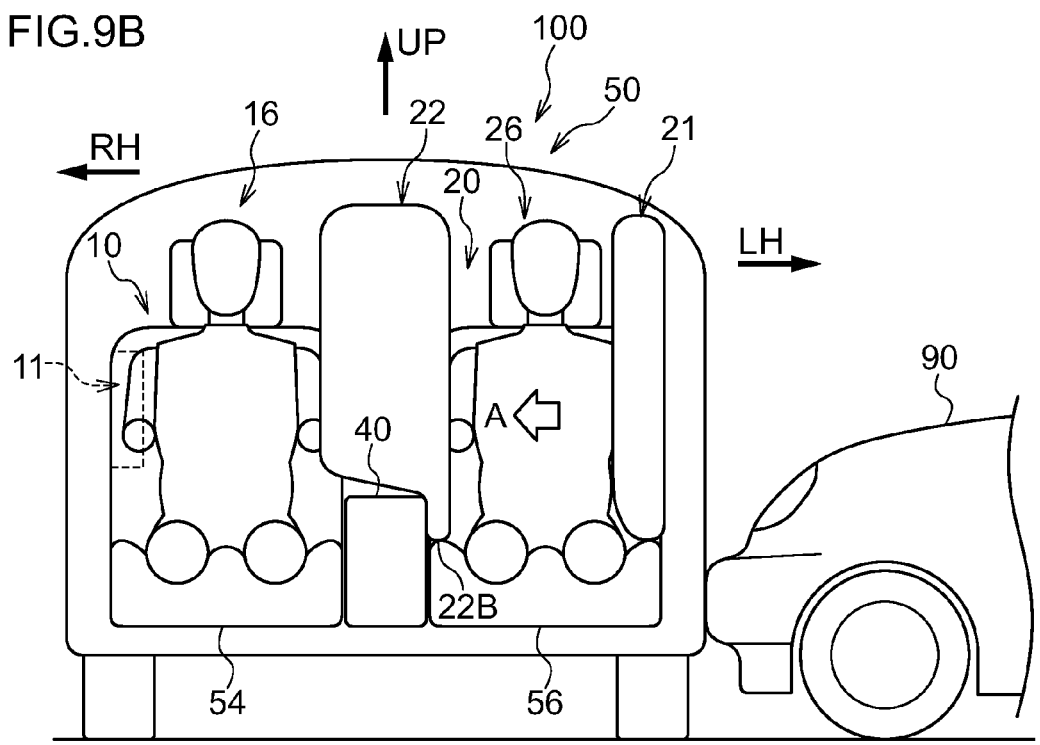
FIG. 9B is a front view showing a state in which the front passenger seat inside airbag has inflated and deployed later than the front passenger seat outside airbag.

At this time, as shown in FIG. 9B for example, a bottom portion 22B of the front passenger seat inside airbag 22 inflates and deploys at a position on a vehicle lower side of an upper surface of a console 40 disposed between the driver seat 10 and the front passenger seat 20. This means that when the front passenger seat inside airbag 22 inflates and deploys, the lower portion of the front passenger seat inside airbag 22 enters and inflates and deploys in the space between the waist of the front passenger seat occupant 26 and the console 40. Consequently, the upper surface of the console 40 is not limited to being a flat surface. It is preferred that the bottom portion 22B come into proximity to, or into contact with, the seat cushion 56 of the front passenger seat 20. The reason for this is to allow the lower portion of the front passenger seat inside airbag 22 to deeply enter the space between the front passenger seat occupant 26 and the console 40 and stably produce, in the console 40, a reaction force at the time of occupant restraint. The same is also true of a bottom portion 12B (FIG. 7B) of a driver seat inside airbag 12 described later.

In the example shown in FIG. 1, FIG. 12A, FIG. 12B, FIG. 13A, and FIG. 13B, an inside airbag is disposed at the driver seat 10 and in the front passenger seat 20. Specifically, the front passenger seat inside airbag 22 is disposed at the front passenger seat 20 and the driver seat inside airbag 12 is disposed at the driver seat 10. On the other hand, in the examples shown in FIG. 7A to FIG. 10, an inside airbag is disposed at the driver seat 10 or the front passenger seat 20. Specifically, in the example shown in FIG. 7A, FIG. 7B, and FIG. 8, the driver seat inside airbag 12 is disposed at the driver seat 10. In the example shown in FIG. 9A, FIG. 9B, and FIG. 10, the front passenger seat inside airbag 22 is disposed at the front passenger seat 20. The driver seat inside airbag 12 and the front passenger seat inside airbag 22 are shared by the driver seat 10 and the front passenger seat 20. Furthermore, the driver seat inside airbag 12 and the front passenger seat inside airbag 22 are airbags that protect the region from the abdomen or chest to the waist of each of the driver seat occupant 16 and the front passenger seat occupant 26.

In FIG. 4, the webbings 33 and 34 are cloths that do not stretch as easily as the seat cover 29, with each having one end 33A and one end 34A, respectively, secured to the side frame 46 that is one example of a frame of the seat back 25. The side frame 46 is disposed with an attachment bracket 60, which sticks out on the seat rear side of the front passenger seat inside airbag 22, and an attachment bracket 62, which sticks out on the seat width direction inner side of the side frame 46. The outside webbing 33 is disposed on the vehicle width direction inner side (the seat width direction outer side) of the front passenger seat inside airbag 22—specifically between mainly the inside side cover 36B and the pad outside portion 48A—and has the one end 33A fastened to the attachment bracket 60. Furthermore, the inside webbing 34 is disposed on the vehicle width direction outer side (the seat width direction inner side) of the front passenger seat inside airbag 22—specifically between mainly the inside front side cover 38B and the pad inside portion 48B—and has the one end 34A fastened to the attachment bracket 62.

Other ends 33B and 34B of the webbings 33 and 34 are fastened to an inside splitting portion 58 of the seat cover 29 (the sewn portion T3). Specifically, in the inside splitting portion 58, the end portion of the inside side cover 36B, the other end 33B of the webbing 33, the end portion of the inside front side cover 38B, and the other end 34B of the webbing 34 are sewn to each other. The inside splitting portion 58 is a region that splits open in conjunction with the inflation and deployment of the front passenger seat inside airbag 22 and has the same configuration as that of the outside splitting portion 57.

The outside webbing 33 is not fastened to the inside side cover 36B except for the inside splitting portion 58. Likewise, the inside webbing 34 is also not fastened to the inside front side cover 38B except for the inside splitting portion 58. Because of this, even when the tension in the seat cover 29 drops when the front passenger seat inside airbag 22 inflates and deploys, a concentration of stress can be produced in the inside splitting portion 58 by the webbings 33 and 34.

It should be noted that it suffices for a webbing to be disposed at least on the vehicle width direction outer side and the vehicle width direction inner side of the front passenger seat inside airbag 22. Consequently, as shown in FIG. 5, the front passenger seat inside airbag 22 may also be surrounded by a webbing 35. The webbing 35 is, like the webbings 33 and 34, a cloth that does not stretch as easily as the seat cover 29. In FIG. 5, part of the webbing 35 is sandwiched between the front passenger seat inside airbag 22 and the side frame 46. The webbing 35 extends along the outer shape of the front passenger seat inside airbag 22 in the housed state, passes between the pad outside portion 48A and the pad inside portion 48B, and extends to the inside splitting portion 58. It should be noted that, in contrast to the example shown in FIG. 4, a through slit through which the webbing 35 is inserted is formed between the pad outside portion 48A and the pad inside portion 48B.

Additionally, in the inside splitting portion 58, both ends 35A and 35B of the webbing 35 are respectively fastened to the reverse surface of the inside side cover 36B and the reverse surface of the inside front side cover 38B (sewn portions T4 and T5). Moreover, the both ends 35A and 35B of the webbing 35, the inside side cover 36B, and the inside front side cover 38B are sewn to each other in a four-layer overlay (the sewn portion T3).

In FIG. 3, the outside inflator 23 is a gas generation source for supplying the gas for inflation to the front passenger seat outside airbag 21. The outside inflator 23 is placed inside the front passenger seat outside airbag 21, for example, and is attached via a retainer 64 to the vehicle width direction outer side (the seat width direction outer side) of the side frame 44 using a bolt 66 and a nut 68.

A reaction force plate 70 is attached to the side frame 44. The reaction force plate 70 is secured to the side frame 44 at a rear portion 70B of the reaction force plate 70, wraps around the vehicle width direction outer side (the seat width direction outer side) of the front passenger seat outside airbag 21 from the seat rear side of the front passenger seat outside airbag 21, and extends toward the seat front side. In the example shown in the drawings, in order to suppress the pressure of the gas supplied from the outside inflator 23 from acting outward in the seat width direction, a front portion 70A of the reaction force plate 70 is positioned at the side of the outside inflator 23. The outside reinforcement cloth 31 is positioned at the side of the front portion 70A, and the reaction force plate 70 and the reinforcement cloth 31 have a positional relationship in which they partially overlap each other in the vehicle width direction. In FIG. 3, the amount of overlap is indicated by reference sign L.

In FIG. 4 and FIG. 5, the inside inflator 24 is a gas generation source for supplying the gas for inflation to the front passenger seat inside airbag 22. The inside inflator 24 is placed inside the front passenger seat inside airbag 22, for example, and is attached via a retainer 64 to the vehicle width direction inner side (the seat width direction outer side) of the side frame 46 using a bolt 66 and a nut 68.

In FIG. 1, the internal structure of the driver seat 10 relating to the vehicle occupant protection system 100 is bilaterally symmetrical to the internal structure of the front passenger seat 20. Consequently, a driver seat outside airbag 11 and an outside inflator 13 are housed in the vehicle width direction outer side side portion of the seat back 15 of the driver seat 10, but their configurations are the same as those of the front passenger seat outside airbag 21 and the outside inflator 23, respectively. Furthermore, the driver seat inside airbag 12 and an inside inflator 14 are housed in the vehicle width direction inner side side portion of the seat back 15 of the driver seat 10, but their configurations are the same as those of the front passenger seat inside airbag 22 and the inside inflator 24, respectively. As shown in FIG. 12B and FIG. 13A, when the driver seat inside airbag 12 inflates and deploys, the bottom portion 12B of the driver seat inside airbag 12 inflates and deploys at a position on the vehicle lower side of the upper surface of the console 40. It is preferred that the bottom portion 12B come into proximity to, or into contact with, the seat cushion 54 of the driver seat 10.

The structure using the reinforcement cloths 31 and 32 shown in FIG. 3 is applied around the driver seat outside airbag 11. Furthermore, the structure using the webbings 33 and 34 shown in FIG. 4 or the webbing 35 shown in FIG. 5 is applied around the driver seat inside airbag 12.

In FIG. 1, the airbag ECU 30 is electrically connected to a side crash sensor 80 and each of the inflators. The airbag ECU 30 is configured in such a way that, when it detects a side crash on the basis of a signal from the side crash sensor 80 disposed in the vehicle 50, it appropriately supplies an actuating current to the inflators in accordance with a mount position of the inside airbag and the crash direction. The specific control performed by the airbag ECU 30 will be described with reference to the flowcharts of FIG. 6 and FIG. 11.

Figure 6:
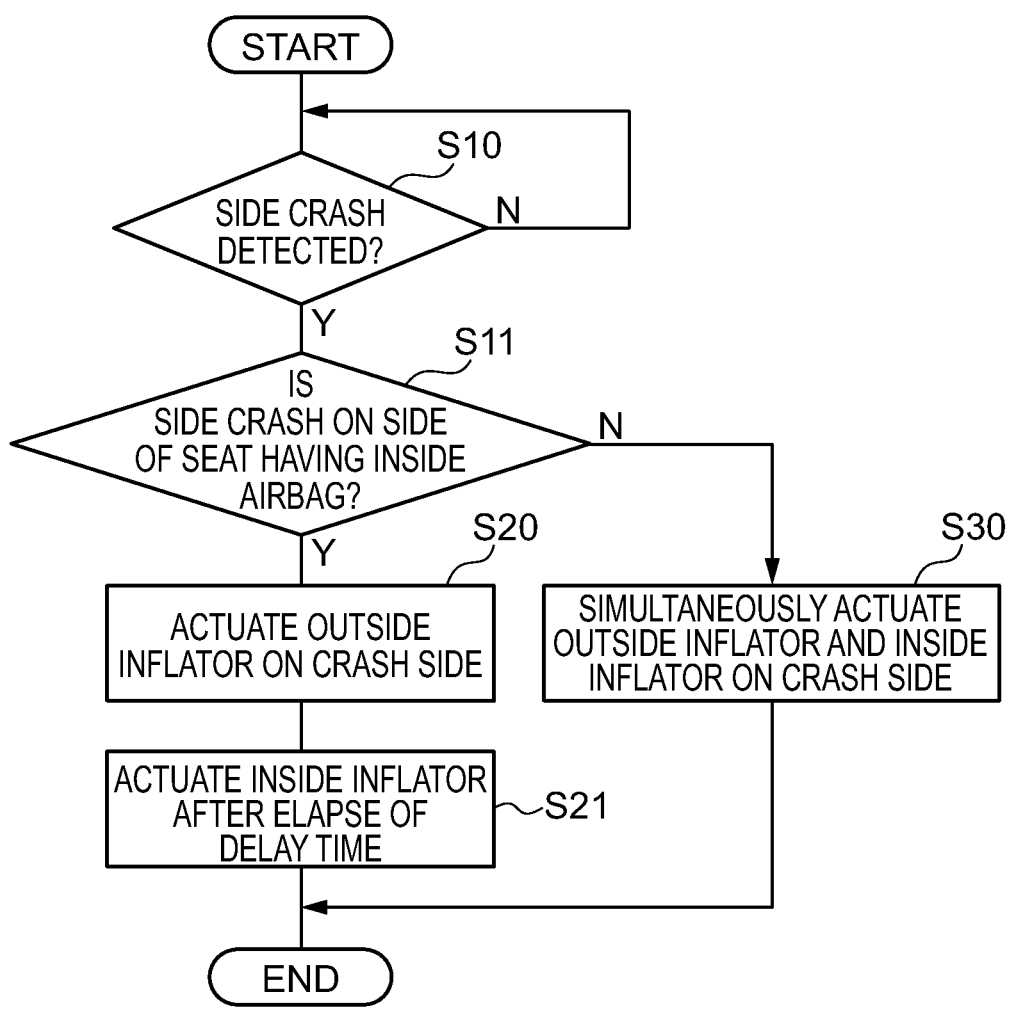
FIG. 6 is a flowchart showing a control flow of the vehicle occupant protection system in a case where an inside airbag is disposed at the driver seat or the front passenger seat.
Figure 8:
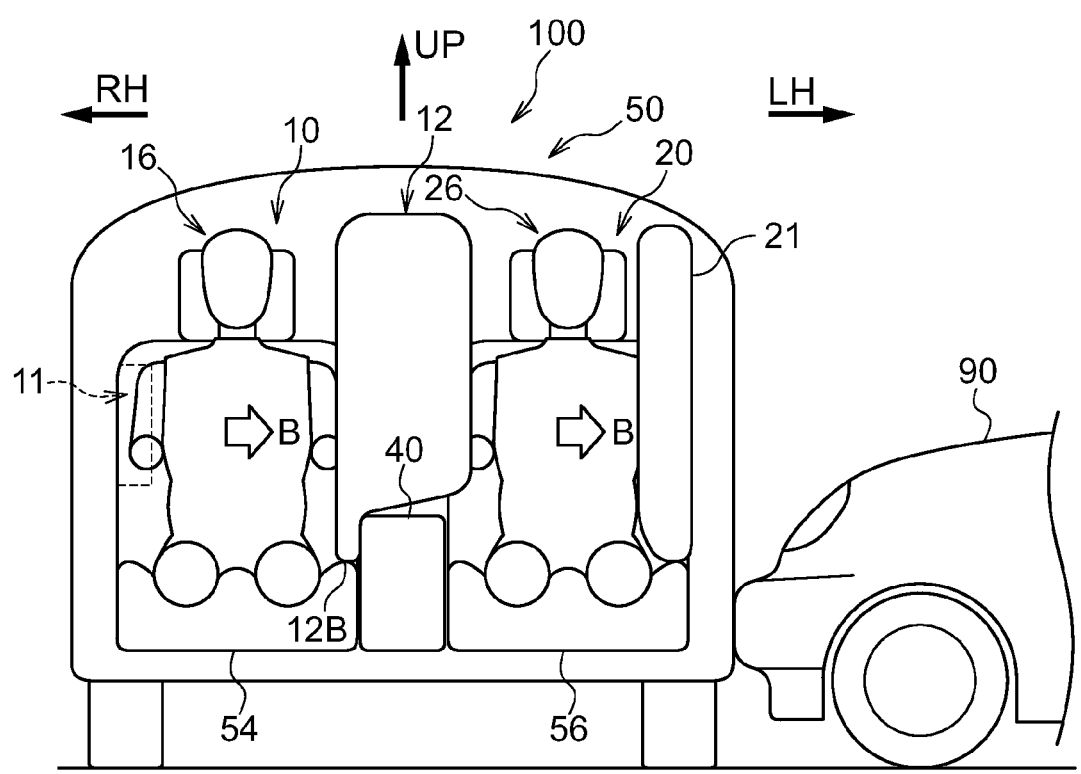
FIG. 8 is a front view showing, in relation to the vehicle occupant protection system in the case where the driver seat inside airbag is disposed, a state in which the front passenger seat outside airbag and the driver seat inside airbag have simultaneously inflated and deployed at the time of a side crash on the front passenger seat side.
Figure 10:
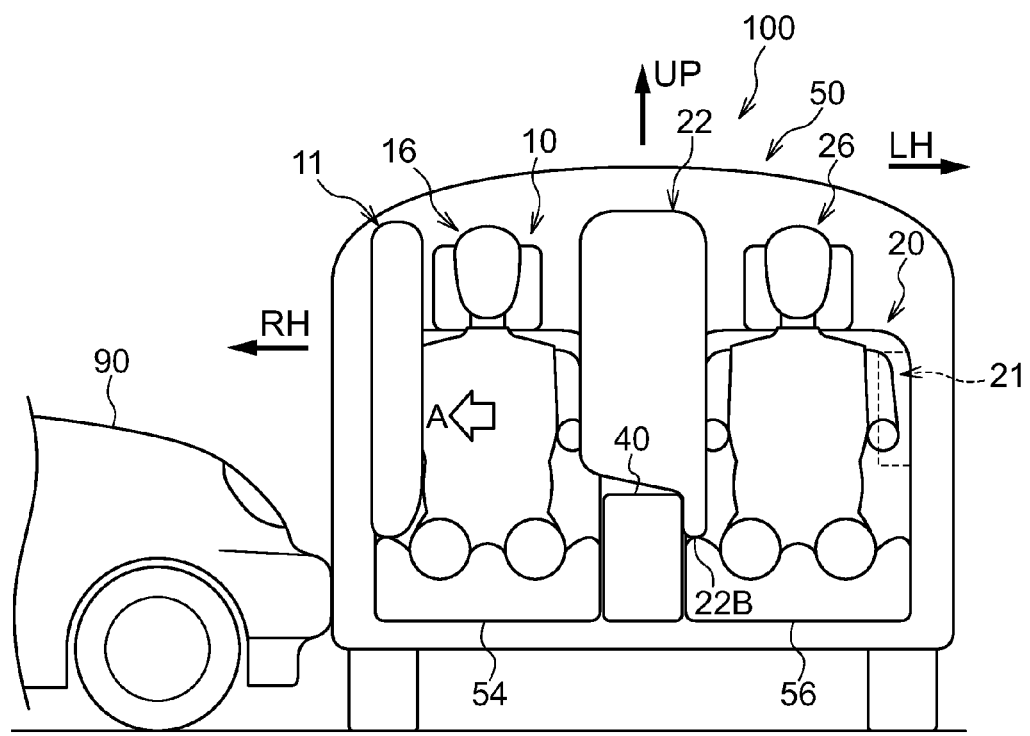
FIG. 10 is a front view showing, in relation to the vehicle occupant protection system in the case where the front passenger seat inside airbag is disposed, a state in which the driver seat outside airbag and the front passenger seat inside airbag have simultaneously inflated and deployed at the time of a side crash on the driver seat side.

The flowchart of FIG. 6 shows a flow of deployment control in a case where an inside airbag is disposed at only the driver seat 10 (the driver seat inside airbag 12 in FIG. 7A, FIG. 7B, and FIG. 8) or a case where an inside airbag is disposed at only the front passenger seat 20 (the front passenger seat inside airbag 22 in FIG. 9A, FIG. 9B, and FIG. 10). When a side crash is detected in step S10, in step S11 it is judged whether or not the side crash has occurred on the side of the seat having the inside airbag. In a case where the side crash has occurred on the side of the seat having the inside airbag due to a partner vehicle 90 (FIG. 7A, FIG. 7B, etc.), in step S20 the airbag ECU 30 actuates the outside inflator of the seat on the crash side. Then, in step S21 the airbag ECU 30 actuates the inside inflator after the elapse of a predetermined delay time with respect to the actuation timing of the outside inflator. Because of this, the gas for inflation is supplied to the inside airbag of the seat on the crash side later than it is to the outside airbag of the seat on the crash side.

On the other hand, in a case where, in step S11, the side crash occurred on the side of the seat not having the inside airbag, the airbag ECU 30 simultaneously actuates the outside inflator and the inside inflator of the seat on the crash side. Because of this, the gas for inflation is simultaneously supplied to the outside airbag of the seat on the crash side and the inside airbag of the seat on the opposite side from the crash side.

Figure 11:
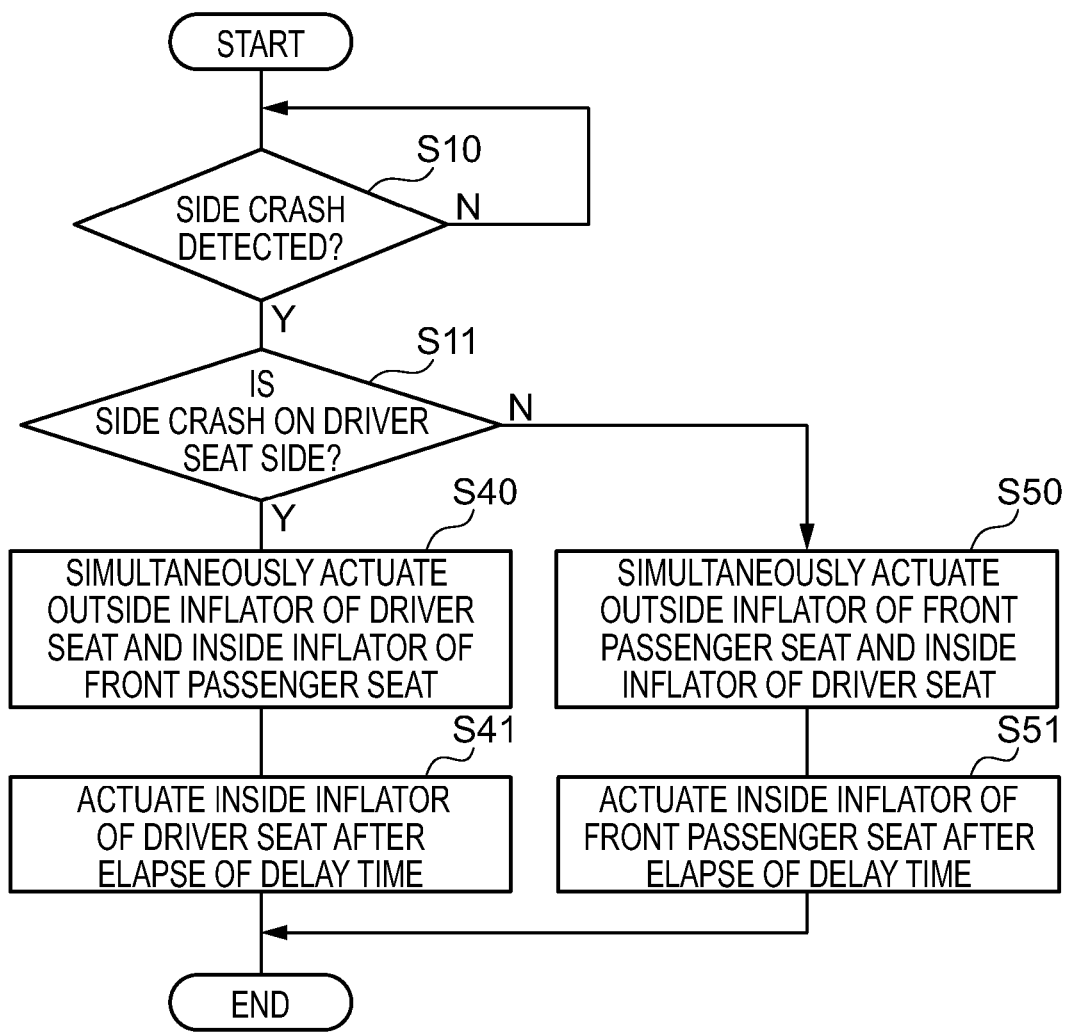
FIG. 11 is a flowchart showing a control flow of the vehicle occupant protection system in a case where the driver seat inside airbag and the front passenger seat inside airbag are disposed.

Next, the flowchart of FIG. 11 shows a flow of deployment control in a case where an inside airbag is disposed at the driver seat 10 and the front passenger seat 20 (the driver seat inside airbag 12 and the front passenger seat inside airbag 22 in FIG. 12A, FIG. 12B, FIG. 13A, and FIG. 13B). Steps S10 and S11 are similar to those of the flowchart of FIG. 6. In step S11 it is judged whether or not the side crash has occurred on the driver seat 10 side. In a case where the side crash has occurred on the driver seat 10 side, in step S40 the airbag ECU 30 simultaneously actuates the outside inflator 13 of the driver seat 10 and the inside inflator 24 of the front passenger seat 20. Then, in step S41, the airbag ECU 30 actuates the inside inflator 14 of the driver seat 10 after the elapse of the predetermined delay time with respect to the actuation timing of these inflators. Because of this, the gas for inflation is supplied to the driver seat inside airbag 12 later than it is to the driver seat outside airbag 11 and the front passenger seat inside airbag 22 (see FIG. 12A and FIG. 12B).

On the other hand, in a case where the side crash has occurred on the front passenger seat 20 side, in step S50 the airbag ECU 30 simultaneously actuates the outside inflator 23 of the front passenger seat 20 and the inside inflator 14 of the driver seat 10. Then, in step S51, the airbag ECU 30 actuates the inside inflator 24 of the front passenger seat 20 after the elapse of the predetermined delay time with respect to the actuation timing of these inflators. Because of this, the gas for inflation is supplied to the front passenger seat inside airbag 22 later than it is to the front passenger seat outside airbag 21 and the driver seat inside airbag 12 (see FIG. 13A and FIG. 13B).

In any case, when inflating and deploying both the outside airbag and the inside airbag disposed at one seat, the airbag ECU 30 actuates the inside inflator later than the outside inflator. Furthermore, when inflating and deploying the outside airbag of the seat on the crash side and the inside airbag of the seat on the opposite side from the crash side, the airbag ECU 30 simultaneously actuates the outside inflator and the inside inflator.

(Action)

First, the action when inflating and deploying the front passenger seat outside airbag 21 and the front passenger seat inside airbag 22 disposed at the front passenger seat 20 will be described with reference to FIG. 2 to FIG. 5.

The front passenger seat outside airbag 21 is supplied with the gas for inflation from the outside inflator 23 and starts to inflate, and when the outside splitting portion 57 of the seat cover 29 is split open by the inflation pressure of the front passenger seat outside airbag 21, the front passenger seat outside airbag 21 inflates and deploys outside the seat back 25. At this time, a concentration of stress is produced in the outside splitting portion 57 by the reinforcement cloths 31 and 32 attached to the reverse surface of the seat cover 29, so the outside splitting portion 57 can be quickly split open.

The front passenger seat inside airbag 22 is supplied with the gas for inflation from the inside inflator 24 and starts to inflate, and when the inside splitting portion 58 of the seat cover 29 is split open by the inflation pressure of the front passenger seat inside airbag 22, the front passenger seat inside airbag 22 inflates and deploys outside the seat back 25. At this time, a concentration of stress is produced in the inside splitting portion 58 by the webbings 33 and 34, so the inside splitting portion 58 can be quickly split open. The same is also true in the case of the structure using the webbing 35 shown in FIG. 5.

The reinforcement cloths 31 and 32 disposed in correspondence to the front passenger seat outside airbag 21 produce a concentration of stress in the outside splitting portion 57 utilizing the tension in the seat cover 29. In contrast, the webbings 33 and 34 disposed in correspondence to the front passenger seat inside airbag 22 each have one end 33A and 34A, respectively, secured to the side frame 46 of the seat back 25 and have other ends 33B and 34B, respectively, fastened to the inside splitting portion 58. For this reason, a concentration of stress can be produced in the inside splitting portion 58 regardless of the magnitude of the tension in the seat cover 29.

Therefore, when inflating and deploying the front passenger seat outside airbag 21 and the front passenger seat inside airbag 22 of the seat (e.g., the front passenger seat 20) on the crash side at the time of a side crash, the airbag ECU 30 first actuates the outside inflator 23 of the seat on the crash side. Because of this, the gas for inflation is supplied to the front passenger seat outside airbag 21 and the front passenger seat outside airbag 21 inflates and deploys. Furthermore, the airbag ECU 30 actuates the inside inflator 24 of the seat on the crash side later than this. Because of this, the gas is supplied to the front passenger seat inside airbag 22. At this time, the reinforcement cloths 31 and 32 disposed in correspondence to the front passenger seat outside airbag 21 quickly split open the outside splitting portion 57 utilizing the tension in the seat cover 29. When the outside splitting portion 57 corresponding to the front passenger seat outside airbag 21 splits open, the tension in the seat cover 29 drops, but the webbings 33 and 34 disposed in correspondence to the front passenger seat inside airbag 22 are unaffected by the drop in the tension in the seat cover 29 and can quickly split open the inside splitting portion 58. The same is also true in the case of the structure using the webbing 35 shown in FIG. 5.

In the vehicle occupant protection system 100 pertaining to the present embodiment, the driver seat outside airbag 11 and the front passenger seat outside airbag 21 are disposed at the seat backs 15 and 25 of the driver seat 10 and the front passenger seat 20, and the driver seat inside airbag 12 and the front passenger seat inside airbag 22 are disposed at at least one of the seat backs 15 and 25 of the driver seat 10 or the front passenger seat 20. The outside splitting portion 57 using the reinforcement cloths 31 and 32 is disposed in correspondence to the front passenger seat outside airbag 21. According to the present embodiment, in this structure the deployment of the front passenger seat outside airbag 21 can be suppressed from happening later than the deployment of the front passenger seat inside airbag 22.

Next, specific examples of the deployment control of the airbags will be described. In the example shown in FIG. 7A, FIG. 7B, and FIG. 8, an inside airbag is disposed at only the driver seat 10 (the driver seat inside airbag 12). An outside airbag is disposed at both the driver seat 10 and the front passenger seat 20 (the driver seat outside airbag 11 and the front passenger seat outside airbag 21). FIG. 7A and FIG. 7B show a case where a side crash has occurred on the driver seat 10 side due to the partner vehicle 90, so that the seat on the crash side is the driver seat 10 and the seat on the opposite side from the crash side is the front passenger seat 20. The driver seat 10 has the driver seat inside airbag 12, so steps S20 and S21 of the flowchart of FIG. 6 are executed.

In FIG. 7A, the outside inflator 13 (FIG. 1) of the driver seat 10 that is the seat on the crash side is actuated, so the driver seat outside airbag 11 is inflated and deployed. The driver seat occupant 16 is restrained by the driver seat outside airbag 11, so the driver seat occupant 16 can be suppressed from relatively moving in the direction of arrow A with respect to the vehicle 50 due to inertia. Because of this, the driver seat occupant 16 seated on the seat on the crash side can be protected.

The inside inflator 14 (FIG. 1) of the driver seat 10 is actuated after the elapse of the predetermined delay time with respect to the actuation timing of the outside inflator 13, so the driver seat inside airbag 12 is inflated and deployed as shown in FIG. 7B. Because of the driver seat inside airbag 12, the front passenger seat occupant 26 seated on the seat on the opposite side from the crash side can be protected and the driver seat occupant 16 can be suppressed from swinging back in the direction of arrow B.

FIG. 8 shows a case where a side crash has occurred on the front passenger seat 20 side due to the partner vehicle 90, so that the seat on the crash side is the front passenger seat 20 and the seat on the opposite side from the crash side is the driver seat 10. The driver seat 10 has the driver seat inside airbag 12, so step S30 of the flowchart of FIG. 6 is executed. Specifically, the outside inflator 23 (FIG. 2) of the front passenger seat 20 that is the seat on the crash side and the inside inflator 14 of the driver seat 10 that is the seat on the opposite side from the crash side are simultaneously actuated. When this happens, the front passenger seat outside airbag 21 and the driver seat inside airbag 12 inflate and deploy at the same timing. Because of the front passenger seat outside airbag 21 and the driver seat inside airbag 12, the front passenger seat occupant 26 and the driver seat occupant 16 can be suppressed from relatively moving in the direction of arrow B with respect to the vehicle 50 due to inertia. Because of this, the front passenger seat occupant 26 and the driver seat occupant 16 can be protected.

At this time, the driver seat occupant 16 positioned at the opposite side from the crash side relatively moves closer to the console 40 due to inertia, but when the driver seat inside airbag 12 inflates and deploys, the bottom portion 12B of the driver seat inside airbag 12 inflates and deploys at a position on the vehicle lower side of the upper surface of the console 40. Because of this, the lower portion of the driver seat inside airbag 12 can be inflated and deployed in the space between the waist of the driver seat occupant 16 and the console 40, and a reaction force at the time of occupant restraint can be produced in the console 40. Because of this, the protection performance resulting from the driver seat inside airbag 12 with respect to the driver seat occupant 16 positioned at the opposite side from the crash side can be enhanced.

In the example shown in FIG. 9A, FIG. 9A, and FIG. 10, an inside airbag is disposed at only the front passenger seat 20 (the front passenger seat inside airbag 22). An outside airbag is disposed at both the driver seat 10 and the front passenger seat 20 (the driver seat outside airbag 11 and the front passenger seat outside airbag 21). FIG. 9A and FIG. 9B show a case where a side crash has occurred on the front passenger seat 20 side due to the partner vehicle 90, so that the seat on the crash side is the front passenger seat 20 and the seat on the opposite side from the crash side is the driver seat 10. The front passenger seat 20 has the front passenger seat inside airbag 22, so steps S20 and S21 of the flowchart of FIG. 6 are executed.

In FIG. 9A, the outside inflator 23 (FIG. 1) of the front passenger seat 20 that is the seat on the crash side is actuated, so the front passenger seat outside airbag 21 is inflated and deployed. The front passenger seat occupant 26 is restrained by the front passenger seat outside airbag 21, so the front passenger seat occupant 26 can be suppressed from relatively moving in the direction of arrow B with respect to the vehicle 50 due to inertia. Because of this, the front passenger seat occupant 26 seated on the seat on the crash side can be protected.

The inside inflator 24 (FIG. 1) of the front passenger seat 20 is actuated after the elapse of the predetermined delay time with respect to the actuation timing of the outside inflator 23, so the front passenger seat inside airbag 22 is inflated and deployed as shown in FIG. 9B. Because of the front passenger seat inside airbag 22, the driver seat occupant 16 seated on the seat on the opposite side from the crash side can be protected and the front passenger seat occupant 26 can be suppressed from swinging back in the direction of arrow A.

FIG. 10 shows a case where a side crash has occurred on the driver seat 10 side due to the partner vehicle 90, so the seat on the crash side is the driver seat 10 and the seat on the opposite side from the crash side is the front passenger seat 20. The front passenger seat 20 has the front passenger seat inside airbag 22, so step S30 of the flowchart of FIG. 6 is executed. Specifically, the outside inflator 13 (FIG. 1) of the driver seat 10 that is the seat on the crash side and the inside inflator 24 of the front passenger seat 20 that is the seat on the opposite side from the crash side are simultaneously actuated. When this happens, the driver seat outside airbag 11 and the front passenger seat inside airbag 22 inflate and deploy at the same timing. Because of the driver seat outside airbag 11 and the front passenger seat inside airbag 22, the driver seat occupant 16 and the front passenger seat occupant 26 can be suppressed from relatively moving in the direction of arrow A with respect to the vehicle 50 due to inertia. Because of this, the driver seat occupant 16 and the front passenger seat occupant 26 can be protected.

At this time, like in the case of FIG. 8, the lower portion of the front passenger seat inside airbag 22 is inflated and deployed in the space between the front passenger seat occupant 26 positioned at the opposite side from the crash side and the console 40, and a reaction force at the time of occupant restraint is produced in the console 40.

In the examples shown in FIG. 7A to FIG. 10, no matter whether the crash direction is on the driver seat 10 side or the front passenger seat 20 side, during the initial stage of the crash the occupant seated on the seat on the crash side can be protected by the outside airbag and the occupant seated on the seat on the opposite side from the crash side can be protected by the inside airbag. Furthermore, because of this, occupant protection performance can be ensured and at the same time the number of inside airbags can be reduced to thereby reduce costs.

Figure 12A:
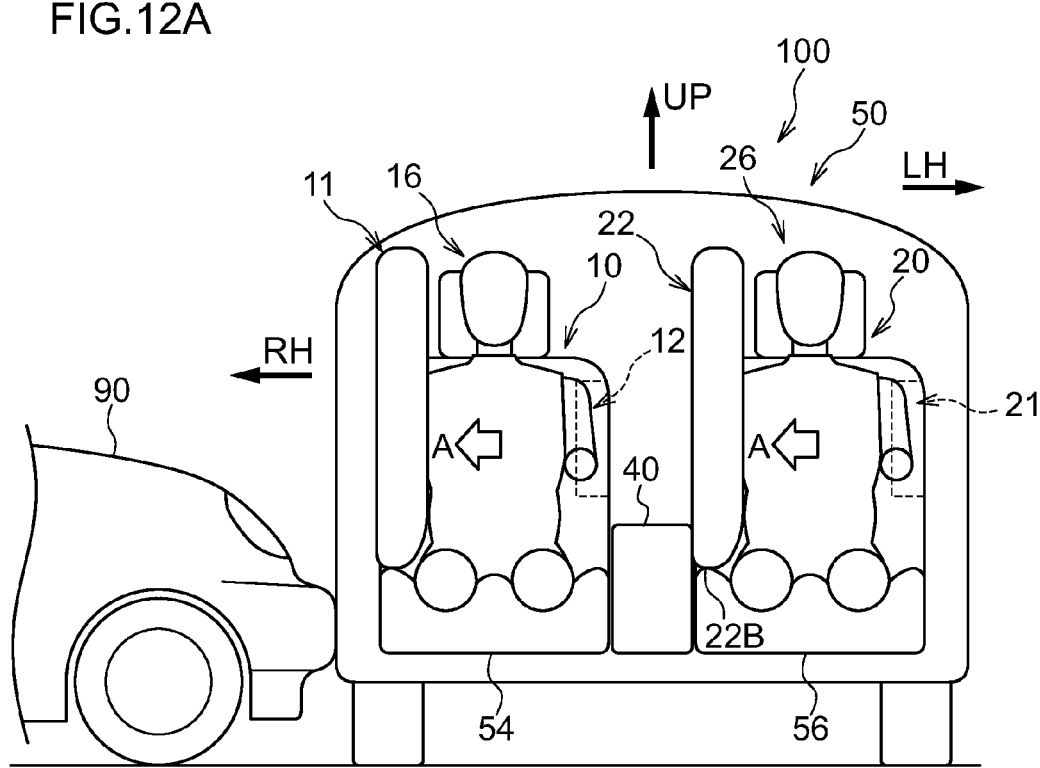
FIG. 12A is a front view showing, in the vehicle occupant protection system in a case where the driver seat inside airbag and the front passenger seat inside airbag are disposed, a state in which the driver seat outside airbag and the front passenger seat inside airbag have simultaneously inflated and deployed at the time of a side crash on the driver seat side.
Figure 12B:
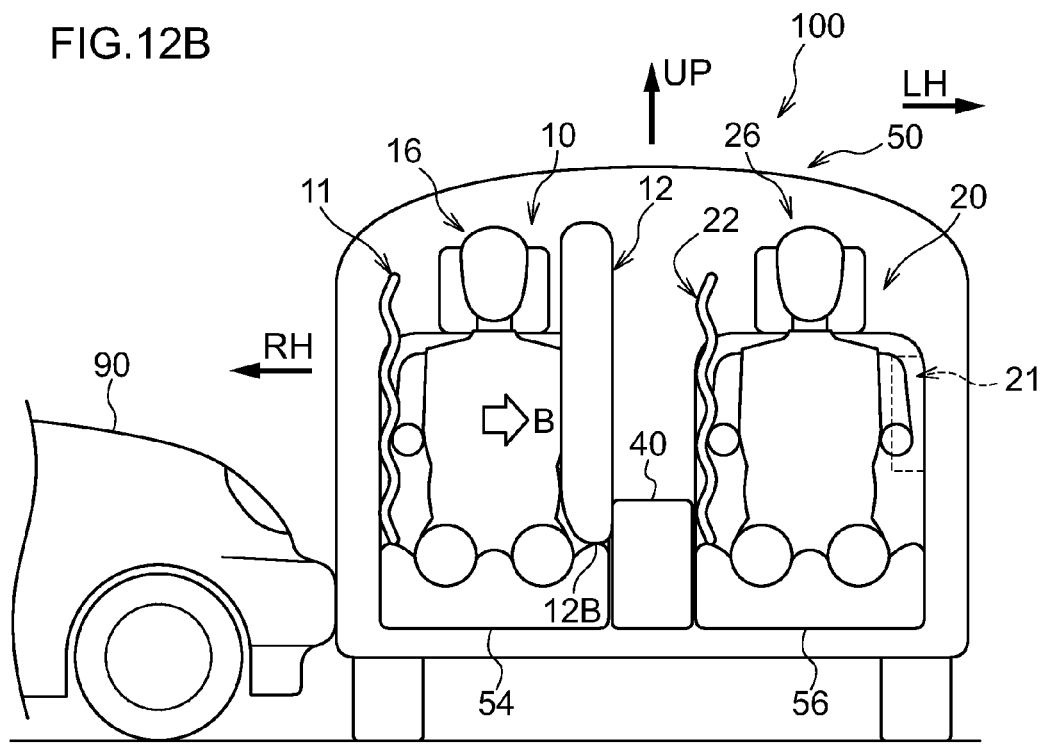
FIG. 12B is a front view showing a state in which the driver seat inside airbag has inflated and deployed later than the driver seat outside airbag and the front passenger seat inside airbag.
Figure 13A:
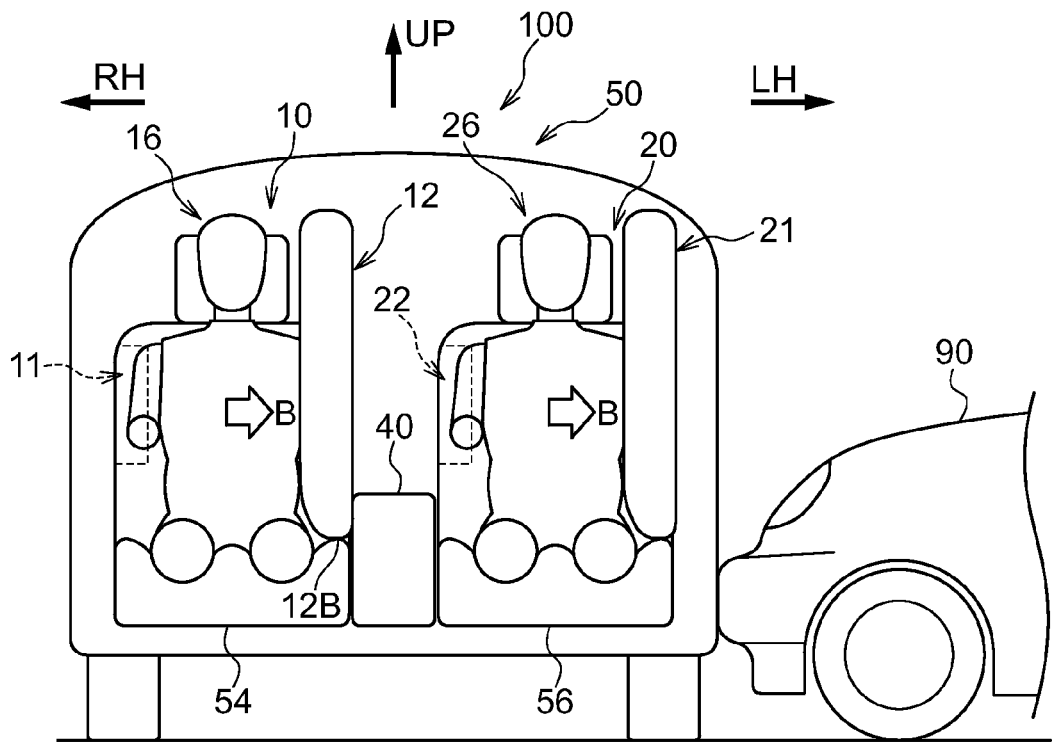
FIG. 13A is a front view showing, in relation to the vehicle occupant protection system in the case where the driver seat inside airbag and the front passenger seat inside airbag are disposed, a state in which the front passenger seat outside airbag and the driver seat inside airbag have simultaneously inflated and deployed at the time of a side crash on the front passenger seat side.

Next, in the example shown in FIG. 12A, FIG. 12B, FIG. 13A, and FIG. 13B, an inside airbag is disposed at both the driver seat 10 and the front passenger seat 20 (the driver seat inside airbag 12 and the front passenger seat inside airbag 22). An outside airbag is also disposed at both the driver seat 10 and the front passenger seat 20 (the driver seat outside airbag 11 and the front passenger seat outside airbag 21). FIG. 12A and FIG. 12B show a case where a side crash has occurred on the driver seat 10 side due to the partner vehicle 90, so steps S40 and S41 of the flowchart of FIG. 11 are executed.

In FIG. 12A, the outside inflator 13 (FIG. 1) of the driver seat 10 and the inside inflator 24 of the front passenger seat 20 are simultaneously actuated, so the driver seat outside airbag 11 and the front passenger seat inside airbag 22 are simultaneously inflated and deployed. The driver seat occupant 16 is restrained by the driver seat outside airbag 11 and the front passenger seat occupant 26 is restrained by the front passenger seat inside airbag 22, so the driver seat occupant 16 and the front passenger seat occupant 26 can both be suppressed from relatively moving in the direction of arrow A with respect to the vehicle 50 due to inertia.

The inside inflator 14 (FIG. 1) of the driver seat 10 is actuated after the elapse of the predetermined delay time with respect to the actuation timing of the outside inflator 13 and the inside inflator 24, so the driver seat inside airbag 12 is inflated and deployed as shown in FIG. 12B. Because of the driver seat inside airbag 12, the driver seat occupant 16 can be suppressed from swinging back in the direction of arrow B. In this way, the driver seat occupant 16 and the front passenger seat occupant 26 can be protected.

It should be noted that if the delay time is long, the driver seat outside airbag 11 and the front passenger seat inside airbag 22 that were the first to inflate and deploy start to deflate as shown in FIG. 12B, but in a case where the delay time is short, the driver seat inside airbag 12 can be inflated and deployed before the driver seat outside airbag 11 and the front passenger seat inside airbag 22 start to deflate.

Figure 13B:
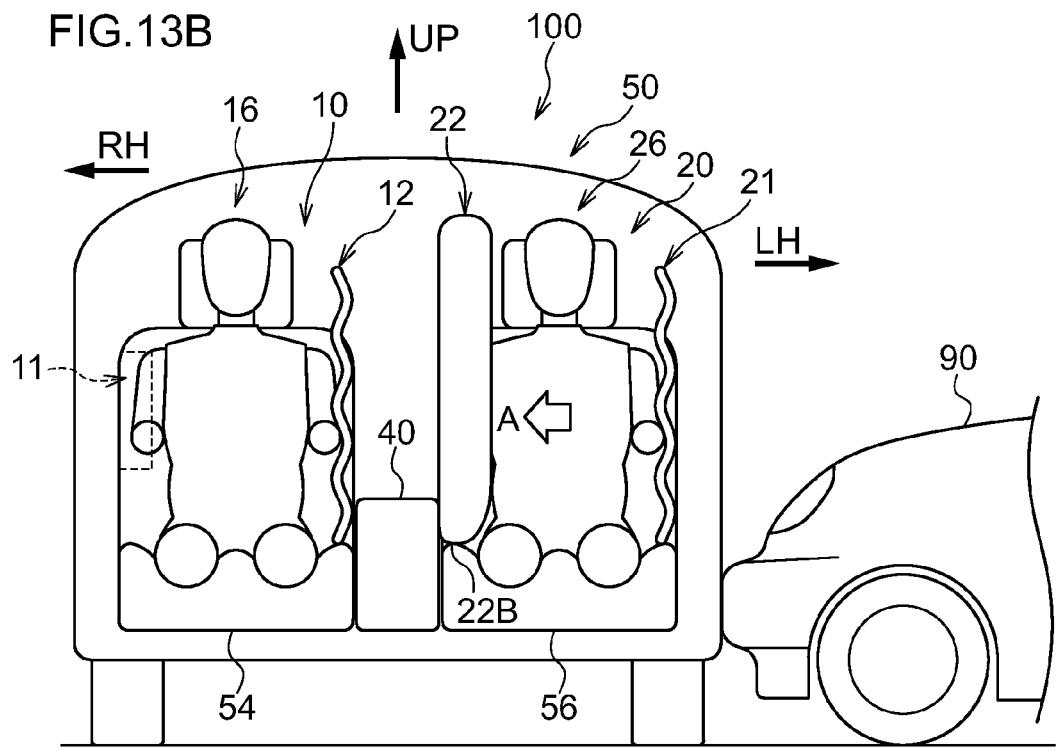
FIG. 13B is a front view showing a state in which the front passenger seat inside airbag has inflated and deployed later than the front passenger seat outside airbag and the driver seat inside airbag.

FIG. 13A and FIG. 13B show a case where a side crash has occurred on the front passenger seat 20 side due to the partner vehicle 90, so steps S50 and S51 of the flowchart of FIG. 11 are executed. In FIG. 13A, the outside inflator 23 (FIG. 1) of the front passenger seat 20 and the inside inflator 14 of the driver seat 10 are simultaneously actuated, so the front passenger seat outside airbag 21 and the driver seat inside airbag 12 are simultaneously inflated and deployed. The front passenger seat occupant 26 is restrained by the front passenger seat outside airbag 21 and the driver seat occupant 16 is restrained by the driver seat inside airbag 12, so the front passenger seat occupant 26 and the driver seat occupant 16 can both be suppressed from relatively moving in the direction of arrow B with respect to the vehicle 50 due to inertia.

The inside inflator 24 (FIG. 1) of the front passenger seat 20 is actuated after the elapse of the predetermined delay time with respect to the actuation timing of the outside inflator 23 and the inside inflator 14, so the front passenger seat inside airbag 22 is inflated and deployed as shown in FIG. 13B. Because of the front passenger seat inside airbag 22, the front passenger seat occupant 26 can be suppressed from swinging back in the direction of arrow A. In this way, the front passenger seat occupant 26 and the driver seat occupant 16 can be protected.

In the example shown in FIG. 12A, FIG. 12B, FIG. 13A, and FIG. 13B, an inside airbag is disposed at both the driver seat 10 and the front passenger seat 20. No matter whether a side crash occurs on the driver seat 10 side or the front passenger seat 20 side, first the outside airbag of the seat on the crash side and the inside airbag of the seat on the opposite side from the crash side simultaneously inflate and deploy, and the inside airbag on the crash side inflates and deploys later than this. Because of this, during the initial stage of the side crash the occupant seated on the seat on the crash side can be protected by the outside airbag of that seat and the occupant seated on the seat on the opposite side from the crash side can be protected by the inside airbag of that seat. Furthermore, thereafter, the occupant seated on the seat on the crash side can be suppressed by the inside airbag of that seat from moving toward the opposite side from the crash side due to the reaction force of the outside airbag. In other words, not only occupant protection performance during the initial stage of a crash but also occupant protection performance at an advanced stage of the crash can be ensured.

Other Embodiments

An example of an embodiment of the present invention has been described above, but the embodiment of the present invention is not limited to what is described above and of course can be modified and implemented in a variety of ways in addition to what is described above without departing from the spirit thereof.

"At the time of a side crash" includes not only a case where a side crash has actually occurred but also a case where a side crash has been foreseen (predicted) by a precrash sensor (not shown in the drawings).

The airbag ECU 30 serves as the control unit, but it is not invariably necessary for the control unit to be an independent electronic control unit. The same functions as those of the airbag ECU 30 may also be incorporated in another control device disposed in the vehicle 50.

When the driver seat inside airbag 12 and the front passenger seat inside airbag 22 inflate and deploy, the bottom portions 12B and 22B thereof inflate and deploy in positions on the vehicle lower side of the upper surface of the console 40, but this does not apply to the case of vehicles that do not have the console 40.

The disclosure of Japanese Patent Application No. 2014-245153 filed on Dec. 3, 2014 is incorporated in its entirety by reference herein.

All documents, patent applications, and technical standards mentioned in this specification are incorporated by reference herein to the same extent as if each individual document, patent application, or technical standard were specifically and individually indicated to be incorporated by reference.

What is claimed is:

1. A vehicle occupant protection system, comprising:
    an outside airbag that is housed in a side portion at a vehicle width direction outer side of a seat back of at least one of a driver seat or a front passenger seat;
    reinforcement cloths that are attached to a reverse surface of a seat cover, in a region at a vehicle width direction outer side, and a region at a seat front side, of the outside airbag, the reinforcement cloths being attached from an outside splitting portion that splits open in conjunction with inflation and deployment of the outside airbag, and the reinforcement cloths not stretching as easily as the seat cover;
    an inside airbag that is housed in a side portion at a vehicle width direction inner side of the seat back;
    webbings that are secured to a frame of the seat back and that are disposed at least at a vehicle width direction outer side and a vehicle width direction inner side of the inside airbag, each having an end portion fastened to an inside splitting portion that splits open in conjunction with inflation and deployment of the inside airbag, the webbings not stretching as easily as the seat cover;
    an outside inflator that is disposed in correspondence to the outside airbag and supplies a gas for inflation to the outside airbag;
    an inside inflator that is disposed in correspondence to the inside airbag and supplies a gas for inflation to the inside airbag; and a control unit which, at a time of a side crash, actuates the inside inflator later than the outside inflator when inflating and deploying the outside airbag and the inside airbag of a seat on the crash side.

2. The vehicle occupant protection system according to claim 1, wherein:
the seat cover has an outside side cover that is disposed on a vehicle width direction outer side of the outside airbag from the outside splitting portion, and an outside front side cover that is disposed on a seat front side of the outside airbag from the outside splitting portion;
the reinforcement cloths have a vehicle width direction outer side reinforcement cloth and a seat front side reinforcement cloth;
the vehicle width direction outer side reinforcement cloth is sewn to a reverse surface of the outside side cover;
the seat front side reinforcement cloth is sewn to a reverse surface of the outside front side cover; and
in the outside splitting portion, the end portions of the outside side cover and the vehicle width direction outer side reinforcement cloth and the end portions of the outside front side cover and the seat front side reinforcement cloth are sewn to each other.

3. The vehicle occupant protection system according to claim 2, wherein:
a reaction force plate is attached to the frame;
the reaction force plate is secured to the frame at a rear portion of the reaction force plate, wraps around the vehicle width direction outer side of the outside airbag from a seat rear side of the outside airbag, and extends toward the seat front side;
a front portion of the reaction force plate is positioned at a side of the outside inflator; and
the vehicle width direction outer side reinforcement cloth is positioned at a side of the front portion.

4. The vehicle occupant protection system according to claim 1, wherein:
the seat cover has an inside side cover that is provided on a vehicle width direction inner side of the inside airbag from the inside splitting portion, and an inside front side cover that is provided on a seat front side of the inside airbag from the inside splitting portion;
the webbings has an inside webbing that is disposed on a seat width direction inner side of the inside airbag, and an outside webbing that is disposed on a seat width direction outer side of the inside airbag;
one end of the inside webbing and one end of the outside webbing are secured to the frame; and
in the inside splitting portion, an end portion of the inside side cover, the other end of the outside webbing, an end portion of the inside front side cover, and the other end of the inside webbing are sewn to each other.

5. The vehicle occupant protection system according to claim 4, wherein:
the outside webbing is not fastened to the inside side cover except for the inside splitting portion; and
the inside webbing is also not fastened to the inside front side cover except for the inside splitting portion.

6. The vehicle occupant protection system according to claim 1, wherein:
the seat cover has an inside side cover that is provided on a vehicle width direction inner side of the inside airbag from the inside splitting portion, and an inside front side cover that is provided on a seat front side of the inside airbag from the inside splitting portion;
in the inside splitting portion, both ends of the webbing are respectively fastened to the reverse surface of the inside side cover and the reverse surface of the inside front side cover; and
the both ends of the webbing, the inside side cover, and the inside front side cover are sewn to each other in a four-layer overlay.

7. The vehicle occupant protection system according to claim 1, wherein:
the outside airbag is disposed at the driver seat and the front passenger seat;
when the inside airbag inflates and deploys, a bottom portion of the inside airbag inflates and deploys at a position on a vehicle lower side of an upper surface of a console disposed between the driver seat and the front passenger seat; and
at the time of a side crash, when inflating and deploying the outside airbag of the seat on the crash side and the inside airbag of the seat on the opposite side from the crash side, the control unit simultaneously actuates the outside inflator of the seat on the crash side and the inside inflator of the seat on the opposite side from the crash side.

8. The vehicle occupant protection system according to claim 7, wherein the inside airbag is disposed at the driver seat or the front passenger seat.

9. The vehicle occupant protection system according to claim 8, wherein:
in a case where the side crash has occurred on a side of the seat having the inside airbag, the outside inflator of the seat on the crash side is actuated, then the inside inflator is actuated after the elapse of a predetermined delay time with respect to an actuation timing of the outside inflator; and
in a case where the side crash occurred on the side of the seat not having the inside airbag, the outside inflator and the inside inflator of the seat on the crash side are simultaneously actuated.

10. The vehicle occupant protection system according to claim 7, wherein the inside airbag is disposed at both the driver seat and the front passenger seat.

11. The vehicle occupant protection system according to claim 10, wherein:
in a case where the side crash has occurred on the driver seat side, the outside inflator of the driver seat and the inside inflator of the front passenger seat are simultaneously actuated, and the inside inflator of the driver seat is actuated after an elapse of a predetermined delay time with respect to an actuation timing of these inflators; and
in a case where the side crash has occurred on the front passenger seat side, the outside inflator of the front passenger seat and the inside inflator of the driver seat are simultaneously actuated, and the inside inflator of the front passenger seat is actuate d after the elapse of a predetermined delay time with respect to the actuation timing of these inflators.

* * * * *